(12) United States Patent
Ohki

(10) Patent No.: US 10,641,606 B2
(45) Date of Patent: May 5, 2020

(54) DISTANCE MEASURING DEVICE AND METHOD OF CONTROLLING DISTANCE MEASURING DEVICE

(71) Applicant: Sony Semiconductor Solutions Corporation, Kanagawa (JP)

(72) Inventor: Mitsuharu Ohki, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 218 days.

(21) Appl. No.: 15/766,467

(22) PCT Filed: Jul. 10, 2017

(86) PCT No.: PCT/JP2017/025072
§ 371 (c)(1),
(2) Date: Apr. 6, 2018

(87) PCT Pub. No.: WO2018/042887
PCT Pub. Date: Mar. 8, 2018

(65) Prior Publication Data
US 2018/0292206 A1    Oct. 11, 2018

(30) Foreign Application Priority Data
Aug. 30, 2016 (JP) .................. 2016-168252

(51) Int. Cl.
*G06T 7/557* (2017.01)
*G01C 3/06* (2006.01)
(Continued)

(52) U.S. Cl.
CPC .............. *G01C 3/06* (2013.01); *G01S 7/493* (2013.01); *G01S 7/4914* (2013.01); *G01S 17/36* (2013.01);
(Continued)

(58) Field of Classification Search
CPC . G01C 3/06; G01S 17/36; G01S 17/89; G01S 17/93; G01S 7/4914; G01S 7/493;
(Continued)

(56) References Cited

U.S. PATENT DOCUMENTS 9,906,717 B1* 2/2018 Plank ................. H04N 5/23232
2007/0273686 A1* 11/2007 Watanabe ............. G06T 15/506
345/419
(Continued)

FOREIGN PATENT DOCUMENTS

EP      2 453 658 A1   5/2012
EP      3 015 881 A2   5/2016
(Continued)

OTHER PUBLICATIONS

International Search Report and English translation dated Oct. 3, 2017 in connection with International Application No. PCT/JP2017/025072.
(Continued)

*Primary Examiner* — Carol Wang
(74) *Attorney, Agent, or Firm* — Wolf, Greenfield & Sacks, P.C.

(57) ABSTRACT

Image quality of a depth map is improved in a distance measuring device for receiving intermittent light.
In a pixel array unit, a plurality of pixels for receiving predetermined intermittent light is arranged in a two-dimensional lattice pattern. A continuous light image data generating unit generates continuous light image data in which a plurality of pieces of pixel data indicating a luminance of predetermined continuous light is arranged in a two-dimensional lattice pattern on the basis of received light data of each of the plurality of pixels. A depth map generating unit generates a depth map in which distance information cor-
(Continued)

responding to each of the plurality of pixels is arranged, from the received light data and the continuous light image data.

7 Claims, 22 Drawing Sheets

(51) Int. Cl.
| | | |
|---|---|---|
| *G01S 17/89* | (2020.01) | |
| *G01S 17/93* | (2020.01) | |
| *G01S 17/36* | (2006.01) | |
| *G01S 7/4914* | (2020.01) | |
| *G01S 7/493* | (2006.01) | |
| *G06T 7/55* | (2017.01) | |
| *H04N 5/33* | (2006.01) | |
| *H04N 5/3745* | (2011.01) | |
| *G06T 5/00* | (2006.01) | |

(52) U.S. Cl.
CPC .............. *G01S 17/89* (2013.01); *G01S 17/93* (2013.01); *G06T 5/002* (2013.01); *G06T 7/55* (2017.01); *G06T 7/557* (2017.01); *H04N 5/33* (2013.01); *H04N 5/37452* (2013.01); *G06T 2207/10048* (2013.01); *G06T 2207/20028* (2013.01)

(58) Field of Classification Search
CPC ...... H04N 5/33; H04N 5/37452; G06T 7/557; G06T 7/55; G06T 7/50; G06T 7/593; G06T 5/002; G06T 2207/20028; G06T 2207/10048; G06T 2207/10028; G06T 2207/10052; G06T 3/4053
See application file for complete search history.

(56) References Cited

U.S. PATENT DOCUMENTS

| | | | |
|---|---|---|---|
| 2007/0279500 A1* | 12/2007 | Castorina ................ | G06T 5/008 348/254 |
| 2010/0046802 A1 | 2/2010 | Watanabe et al. | |
| 2012/0274798 A1 | 11/2012 | Takahashi et al. | |
| 2014/0253688 A1* | 9/2014 | Metz ...................... | G01S 17/89 348/46 |
| 2014/0375762 A1 | 12/2014 | Ohki | |
| 2015/0302592 A1 | 10/2015 | Bruls et al. | |
| 2015/0334318 A1 | 11/2015 | Georgiev et al. | |
| 2016/0124089 A1 | 5/2016 | Meinherz et al. | |
| 2016/0205380 A1* | 7/2016 | Inoue ........................ | G06T 7/73 348/46 |
| 2018/0189591 A1 | 7/2018 | Ohki et al. | |
| 2018/0348369 A1 | 12/2018 | Ohki | |

FOREIGN PATENT DOCUMENTS

| | | |
|---|---|---|
| JP | 2009-085705 A | 4/2009 |
| JP | 2010-071976 A | 4/2010 |
| JP | 2011-035894 A | 2/2011 |
| JP | 2015-121430 A | 7/2015 |
| JP | 2015-522198 A | 8/2015 |
| JP | 2015-175752 A | 10/2015 |
| JP | 2016-509208 A | 3/2016 |
| WO | WO 2014/072926 A1 | 5/2014 |
| WO | WO 2014/102442 A1 | 7/2014 |

OTHER PUBLICATIONS

Chan et al., A Noise-Aware Filter for Real-Time Depth Upsampling, M2SFA2 2008 Workshop on Multi-camera and Multi-model Sensor Fusion, Stanford University, USA, pp. 1-12.

International Written Opinion dated Oct. 3, 2017 in connection with International Application No. PCT/JP2017/025072, and English translation thereof.

International Preliminary Report on Patentability dated Mar. 14, 2019 in connection with International Application No. PCT/JP2017/025072, and English translation thereof.

\* cited by examiner a b a b a b

DISTANCE MEASURING DEVICE AND METHOD OF CONTROLLING DISTANCE MEASURING DEVICE

CROSS-REFERENCE TO RELATED APPLICATIONS

The present application claims the benefit under 35 U.S.C. § 371 as a U.S. National Stage Entry of International Application No. PCT/JP2017/025072, filed in the Japanese Patent Office as a Receiving Office on Jul. 10, 2017, which claims priority to Japanese Patent Application Number JP2016-168252, filed in the Japanese Patent Office on Aug. 30, 2016, each of which applications is hereby incorporated by reference in its entirety.

TECHNICAL FIELD

The present technology relates to a distance measuring device and a method of controlling the distance measuring device. More particularly, the present technology relates to a distance measuring device for measuring a distance from a phase difference of light and a method of controlling the distance measuring device.

BACKGROUND ART

Traditionally, in an electronic device having a distance measuring function, a distance measuring method called as a Time of Flight (ToF) method has been frequently used. In the ToF method, a device irradiates an object with intermittent light such as a sine wave or a rectangular wave, receives reflected light with respect to the irradiation light, and measures a distance from a phase difference between the irradiation light and the reflected light.

In the ToF method, if the reflected light is received by a ToF sensor in which a plurality of pixels is arranged in an array, the device can measure a distance for each pixel and generate a depth map. To improve an image quality of the depth map, a system to which a solid-state imaging device for receiving continuous light, not the intermittent light, and images image data is added has been proposed (for example, refer to Non-Patent Document 1). In this system, the received light data of the ToF sensor and the image data imaged by the solid-state imaging device are input to a cross-bilateral filter to generate the depth map. The cross-bilateral filter is a filter using a Gaussian function and is used for noise removal, upsampling, and the like.

CITATION LIST

Non-Patent Document

Non-Patent Document 1: D. Chan et al., A Noise-Aware Filter for Real-Time Depth Upsampling, ECCV Workshops 2008.

SUMMARY OF THE INVENTION

Problems to be Solved by the Invention

In the related art described above, the depth map with improved image quality than a case where only the ToF sensor is used can be generated by using the cross-bilateral filter. However, there is a problem in that since it is necessary to mount a solid-state imaging device in addition to the ToF sensor, the cost and size of the device are increased. Although it is possible to generate the depth map with only the received light data of the intermittent light from the ToF sensor, the image quality of the depth map is deteriorated than a case where the solid-state imaging device is added. In this way, there is a problem in that the image quality of the depth map cannot be improved with only the received light data of the intermittent light.

The present technology has been made in view of such a situation. An object of the present technology is to improve an image quality of a depth map in a distance measuring device for measuring a distance from a phase difference of light.

Solutions to Problems

The present technology has been made to solve the above problems. A first aspect of the present technology is a distance measuring device including a pixel array unit including a plurality of pixels which receives predetermined intermittent light and is arranged in a two-dimensional lattice pattern, a continuous light image data generating unit which generates continuous light image data in which a plurality of pieces of pixel data indicating a luminance of predetermined continuous light is arranged in a two-dimensional lattice pattern on the basis of received light data of each of the plurality of pixels, and a depth map generating unit which generates a depth map in which distance information corresponding to each of the plurality of pixels is arranged from the received light data and the continuous light image data, and a method of controlling the distance measuring device. With this configuration, an effect is obtained such that the continuous light image data is generated on the basis of the received light data of each of the plurality of pixels for receiving the intermittent light.

In addition, according to the first aspect, each piece of the received light data includes a plurality of charge signals, and the continuous light image data generating unit may generate the continuous light image data by integrating the plurality of charge signals for each of the plurality of pixels. With this configuration, an effect is obtained such that the continuous light image data is generated by processing of integrating the plurality of charge signals.

Furthermore, according to the first aspect, the depth map generating unit may obtain a charge signal when a predetermined function, to which the plurality of charge signals and the continuous light image data have been input, is minimized to generate the depth map from the charge signals. With this configuration, an effect is obtained such that the depth map is generated from the charge signal when the predetermined function is minimized.

Furthermore, according to the first aspect, the depth map generating unit may generate the depth map by using a predetermined filter. With this configuration, an effect is obtained such that the depth map is generated by using the predetermined filter.

Furthermore, according to the first aspect, the pixel array unit is divided into a plurality of pixel blocks, and the depth map generating unit may include a low resolution charge signal generating unit which generates a plurality of charge signals for each of the plurality of pixel blocks by pixel addition to the received light data as low resolution charge signals, a low resolution continuous light image data generating unit which integrates the low resolution charge signal for each of the plurality of pixel blocks and outputs low resolution continuous light image data in which data according to the integrated value is arranged, a low resolution depth map generating unit which generates data in which distance information corresponding to each of the plurality of pixel blocks is arranged as a low resolution depth map on the basis of the low resolution charge signal, and a high resolution depth map generating unit which inputs the continuous light image data, the low resolution continuous light image data, and the low resolution depth map to the predetermined filter to generate the depth map. With this configuration, an effect is obtained such that the depth map is generated by inputting the continuous light image data, the low resolution continuous light image data, and the low resolution depth map to the predetermined filter.

Furthermore, according to the first aspect, the pixel array unit is divided into a plurality of pixel blocks, and the depth map generating unit may include a low resolution charge signal generating unit which generates a plurality of charge signals for each of the plurality of pixel blocks by pixel addition to the received light data as low resolution charge signals, a low resolution continuous light image data generating unit which integrates the low resolution charge signal for each of the plurality of pixel blocks and outputs low resolution continuous light image data in which data according to the integrated value is arranged, a high resolution charge signal generating unit which inputs the continuous light image data, the low resolution continuous light image data, and the low resolution charge signals to the predetermined filter to generate a new charge signal for each of the plurality of pixels as a high resolution charge signal, and a depth converting unit which converts the high resolution charge signal into the distance information. With this configuration, an effect is obtained such that the high resolution charge signal is generated by inputting the continuous light image data, the low resolution continuous light image data, and the low resolution charge signal to the predetermined filter.

Furthermore, according to the first aspect, the depth map generating unit may include a depth converting unit which converts the plurality of charge signals into the distance information and a depth map noise removing unit which inputs the distance information and the continuous light image data to the predetermined filter to remove a noise of the distance information. With this configuration, an effect is obtained such that the noise of the distance information is removed by inputting the distance information and the continuous light image data to the predetermined filter.

Furthermore, according to the first aspect, the depth map generating unit may include a charge signal noise removing unit which inputs the continuous light image data and the plurality of charge signals to the predetermined filter to remove a noise of the plurality of charge signals and a depth converting unit which converts the plurality of charge signals from which the noise has been removed into the distance information. With this configuration, an effect is obtained such that the noise of the plurality of charge signals is removed by inputting the continuous light image data and the plurality of charge signals to the predetermined filter.

Furthermore, according to the first aspect, the plurality of charge signals may include a first, second, third, and fourth charge signals, and the predetermined filter may be a filter in which a weighting coefficient which gets smaller as an absolute difference value between a sum of the first and the second charge signals and a sum of the third and the fourth charge signals is larger is multiplied by a predetermined Gaussian function. With this configuration, an effect is obtained such that the depth map is generated by the filter in which the weighting coefficient which gets smaller as the absolute difference value between the sum of the first and the second charge signals and the sum of the third and the fourth charge signals is larger is multiplied by the predetermined Gaussian function.

Furthermore, according to the first aspect, the plurality of charge signals includes a first, second, third, and fourth charge signals, and the predetermined filter may be a filter in which a weighting coefficient which gets larger as a sum of a square of a difference between the first and the second charge signals and a square of a difference between the third and the fourth charge signals is larger is multiplied by a predetermined Gaussian function. With this configuration, an effect is obtained such that the depth map is generated by the filter in which the weighting coefficient which gets larger as the sum of the square of the difference between the first and the second charge signals and the square of the difference between the third and the fourth charge signals is larger is multiplied by the predetermined Gaussian function.

Furthermore, according to the first aspect, the predetermined filter may include a Gaussian function in which a coefficient which gets larger as a difference between a phase of the intermittent light before a noise is removed and a phase of the intermittent light from which the noise has been removed is smaller is multiplied by a term of a standard deviation. With this configuration, an effect is obtained such that the depth map is generated by the predetermined filter including the Gaussian function in which the coefficient which gets larger as the difference between the phase of the intermittent light before the noise is removed and the phase of the intermittent light from which the noise has been removed is smaller is multiplied by the term of the standard deviation.

Furthermore, according to the first aspect, the pixel array unit receives the predetermined intermittent light in a predetermined period and receives the predetermined continuous light in a continuous light receiving period which is different from the predetermined period, and the continuous light image data generating unit may generate the continuous light image data from the received light data in the continuous light receiving period. With this configuration, an effect is obtained such that the continuous light image data is generated from the received light data within the continuous light receiving period.

Effects of the Invention

According to the present technology, it is possible to obtain an excellent effect that an image quality of a depth map can be improved in a distance measuring device which measures a distance from a phase difference of light. Note that the effects described herein are not necessarily limited and that the effect may be any effects described in the present disclosure.

MODE FOR CARRYING OUT THE INVENTION

Embodiments for carrying out the present technology (referred to as embodiment below) are described below. The description will be made in the following order.
 1. First Embodiment (example of generating infrared image and upsampling depth map)
 2. Second Embodiment (example of generating infrared image and upsampling charge signal)
 3. Third Embodiment (example of generating infrared image and removing noises of charge signal)
 4. Fourth Embodiment (example of generating infrared image and removing noises of depth map)

1. First Embodiment

[Exemplary Configuration of Distance Measuring Module]

Figure 1:
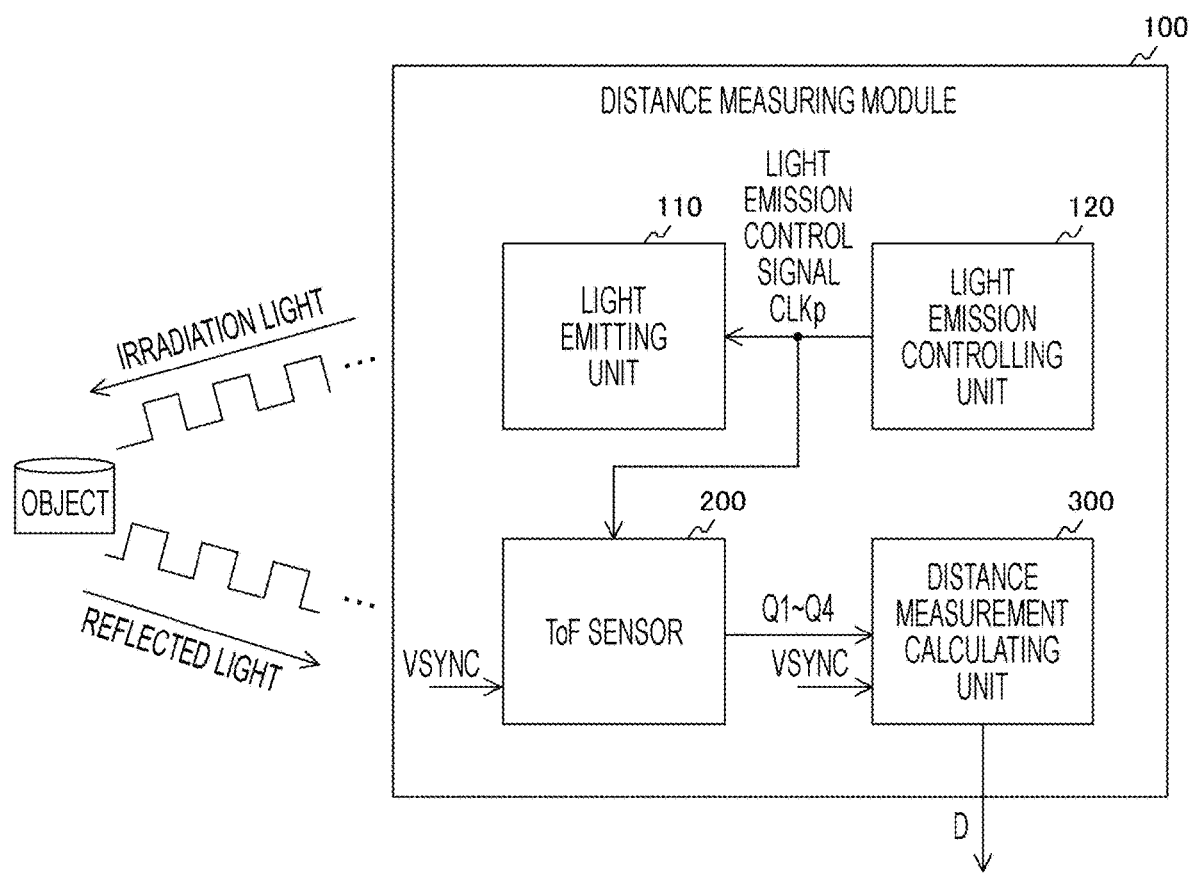
FIG. 1 is a block diagram of an exemplary configuration of a distance measuring module according to a first embodiment of the present technology.

FIG. 1 is a block diagram of an exemplary configuration of a distance measuring module 100 according to an embodiment of the present technology. The distance measuring module 100 measures a distance by using a ToF method, and includes a light emitting unit 110, a light emission controlling unit 120, a ToF sensor 200, and a distance measurement calculating unit 300. Note that the distance measuring module 100 is an exemplary distance measuring device described in Claims.

The light emitting unit 110 intermittently emits irradiation light to an object. For example, the light emitting unit 110 generates the irradiation light in synchronization with a rectangular wave light emission control signal CLKp. Furthermore, for example, a light emitting diode is used as the light emitting unit 110, and near infrared light and the like is used as the irradiation light. Note that the light emission control signal CLKp is not limited to a rectangular wave as long as the signal is a periodic signal. For example, the light emission control signal CLKp may be a sine wave. Furthermore, the irradiation light is not limited to the near infrared light, and may be visible light and the like.

The light emission controlling unit 120 controls the light emitting unit 110. The light emission controlling unit 120 generates the light emission control signal CLKp and supplies the light emission control signal CLKp to the light emitting unit 110 and the ToF sensor 200. A frequency of the light emission control signal CLKp is, for example, 20 megahertz (MHz). Note that the frequency of the light emission control signal CLKp is not limited to 20 megahertz (MHz), and may be five megahertz (MHz) and the like.

The ToF sensor 200 receives reflected light with respect to the intermittent irradiation light and generates a charge signal indicating an amount of received light within a cycle at each time when a cycle of a vertical synchronization signal VSYNC has elapsed. For example, a periodic signal of 60 hertz (Hz) is used as the vertical synchronization signal VSYNC. Furthermore, in the ToF sensor 200, a plurality of pixels is arranged in a two-dimensional lattice pattern. The ToF sensor 200 supplies charge signals generated by the pixels to the distance measurement calculating unit 300. Note that a frequency of the vertical synchronization signal VSYNC is not limited to 60 hertz (Hz) and may be 30 hertz (Hz) or 120 hertz (Hz).

The distance measurement calculating unit 300 measures a distance to the object (in other words, depth) on the basis of the charge signal from the ToF sensor 200 by using the ToF method. The distance measurement calculating unit 300 generates a depth map in which distance information of the plurality of pixels is arranged. The depth map is used, for example, for image processing for performing blurring processing at a degree corresponding to the distance, Auto Focus (AF) processing for finding a focus point of a focus lens according to the distance, and the like.

[Exemplary Configuration of ToF Sensor 200]

Figure 2:
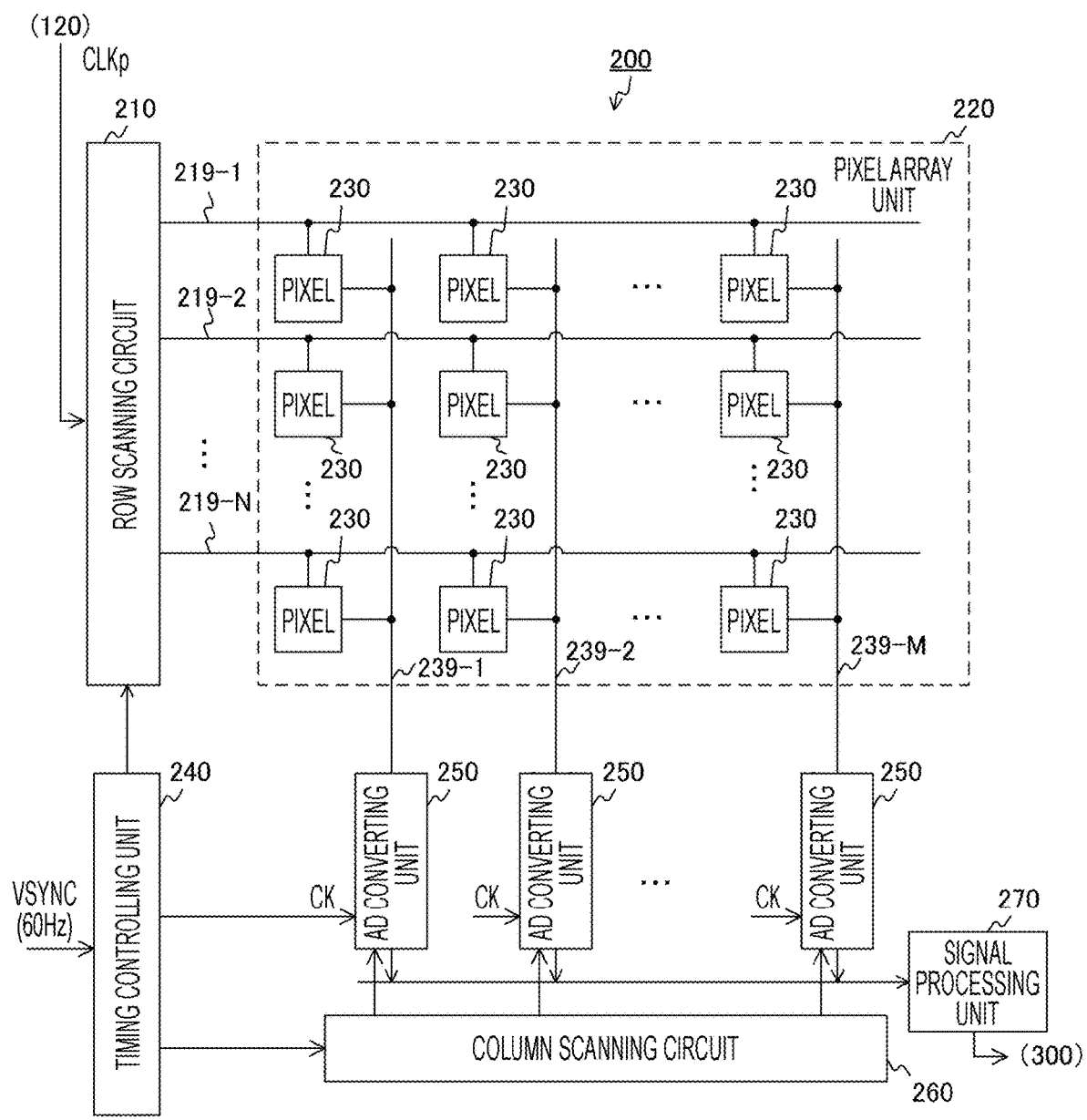
FIG. 2 is a block diagram of an exemplary configuration of a ToF sensor according to the first embodiment of the present technology.

FIG. 2 is a block diagram of an exemplary configuration of the ToF sensor 200 according to the first embodiment. The ToF sensor 200 includes a row scanning circuit 210, a pixel array unit 220, a timing controlling unit 240, a plurality of Analog to Digital (AD) converting units 250, a column scanning circuit 260, and a signal processing unit 270. In the pixel array unit 220, a plurality of pixels 230 is arranged in a two-dimensional lattice pattern. Hereinafter, a group of pixels 230 arranged along a predetermined direction will be referred to as "row", and a group of pixels 230 arranged along a direction perpendicular to the row will be referred to as "column". The AD converting unit 250 is provided for each column.

The timing controlling unit 240 controls the row scanning circuit 210, the AD converting units 250, and the column scanning circuit 260 in synchronization with the vertical synchronization signal VSYNC.

The row scanning circuit 210 simultaneously exposes all the rows and sequentially selects the row after the exposure to make the selected row output pixel signals. The pixel 230 receives the reflected light under control of the row scanning circuit 210 and outputs a charge signal corresponding to the amount of the received light.

The AD converting unit 250 performs AD-conversion to the charge signal from the corresponding column. Under the control of the column scanning circuit 260, the AD converting unit 250 outputs the AD-converted charge signal to the signal processing unit 270. The column scanning circuit 260 sequentially selects the AD converting units 250 to make the selected AD converting unit 250 output the charge signal.

The signal processing unit 270 performs signal processing such as Correlated Double Sampling (CDS) processing on the charge signal. The signal processing unit 270 supplies the charge signal to which the signal processing has been applied to the distance measurement calculating unit 300.

Note that the ToF sensor 200 further includes a lens for collecting the reflected light in actuality. However, the lens is omitted in FIG. 2 for convenience of description.

[Exemplary Configuration of Pixel]

Figure 3:
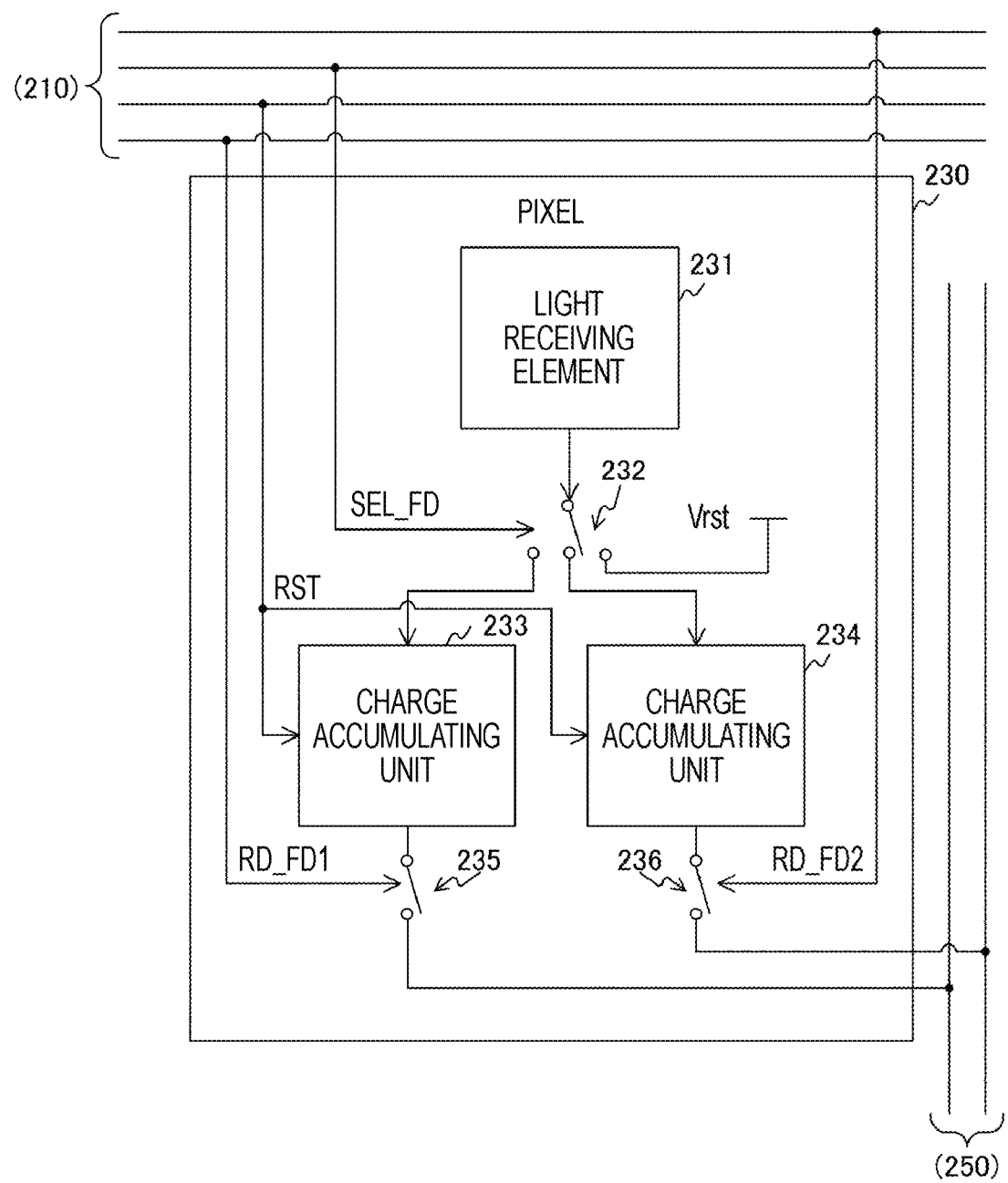
FIG. 3 is a circuit diagram of an exemplary pixel circuit according to the first embodiment of the present technology.

FIG. 3 is a block diagram of an exemplary configuration of a circuit of the pixel 230 according to the first embodiment. The pixel 230 includes a light receiving element 231, a transfer switch 232, charge accumulating units 233 and 234, and selection switches 235 and 236.

The light receiving element 231 photoelectrically converts light to generate a charge. As the light receiving element 231, for example, a photodiode is used.

The transfer switch 232 connects the light receiving element 231 to one of the charge accumulating units 233 and 234, and a reset power supply Vrst under the control of the row scanning circuit 210. The transfer switch 232 is realized by, for example, a plurality of Metal-Oxide-Semiconductor (MOS) transistors. When the light receiving element 231 is connected to the reset power supply Vrst, a charge output from a drain of the MOS transistor is discarded, and the charge of the light receiving element 231 is initialized.

The charge accumulating units 233 and 234 accumulate charges and generate a voltage corresponding to the accumulation amount. For example, a floating diffusion layer is used as the charge accumulating units 233 and 234.

The selection switch 235 opens and closes a line between the charge accumulating unit 233 and the AD converting unit 250 under the control of the row scanning circuit 210. The selection switch 236 opens and closes a line between the charge accumulating unit 234 and the AD converting unit 250 under the control of the row scanning circuit 210. For example, when a FD read signal RD_FD1 is supplied by the row scanning circuit 210, the state of the selection switch 235 transitions to a closed state. When a FD read signal RD_FD2 is supplied by the row scanning circuit 210, the state of the selection switch 236 transitions to a closed state. Each of the selection switches 235 and 236 is realized by, for example, a MOS transistor.

Figure 4:
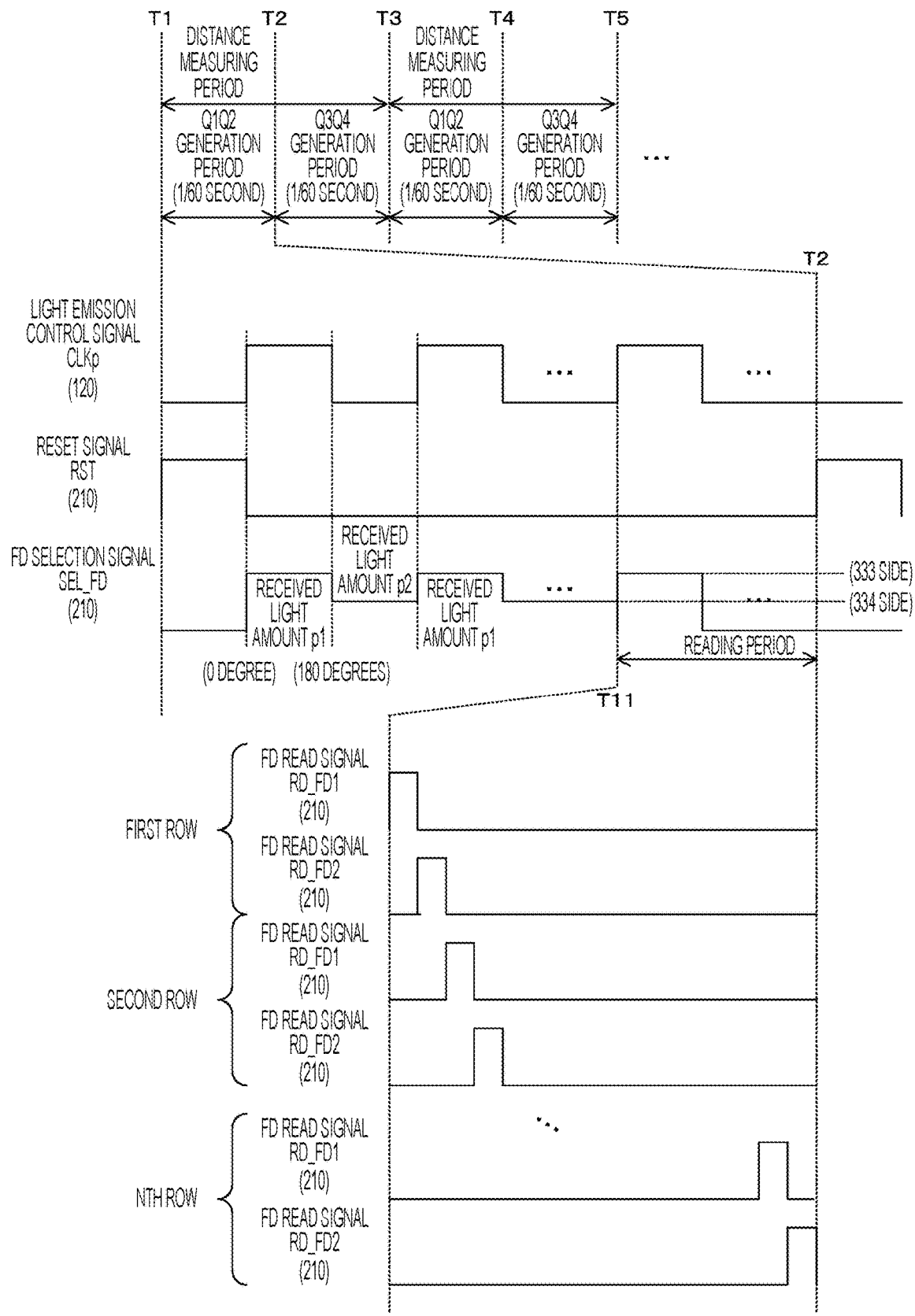
FIG. 4 is a timing chart of an exemplary operation of a solid-state imaging device in a Q1Q2 generation period according to the first embodiment of the present technology.

FIG. 4 is a timing chart of exemplary exposure control of the pixel in a Q1Q2 generation period according to the first embodiment. When irradiation of intermittent light is started, the pixel 230 alternately generates charge signals Q1 and Q2 and charge signals Q3 and Q4 repeatedly. Hereinafter, a generation period of the charge signals Q1 and Q2 is referred to as "Q1Q2 generation period", and a generation period of the charge signals Q3 and Q4 is referred to as "Q3Q4 generation period". The length of each of the Q1Q2 generation period and the Q3Q4 generation period is a cycle of the vertical synchronization signal VSYNC (for example, 1/60 second).

Here, the charge signal Q1 is an accumulation of a received light amount p1 from 0° to 180° over the Q1Q2 generation period as assuming that a specific phase (for example, rising) of the light emission control signal CLKp of intermittent light be 0°. Since the frequency of the light emission control signal CLKp is 20 megahertz (MHz) and is high, the received light amount per cycle (1/20 microsecond) is extremely small, and it is difficult to detect it. Therefore, the pixel 230 accumulates the received light amount p1 over the Q1Q2 generation period such as 1/60 seconds which is longer than the cycle of the light emission control signal CLKp (1/20 microsecond), and generates a signal indicating the total amount as the charge signal Q1. Furthermore, the charge signal Q2 is an accumulation of a received light amount p2 of the reflected light from 180° to 360° over the Q1Q2 generation period.

Furthermore, the charge signal Q3 is an accumulation of a received light amount p3 of the reflected light from 90° to 270° over the Q3Q4 generation period. Furthermore, the charge signal Q4 is an accumulation of a received light amount p4 of the reflected light from 270° to 90° over the Q3Q4 generation period.

From the charge signals Q1, Q2, Q3, and Q4, the distance measuring module 100 can calculate a distance D to the object for each pixel.

For example, in the Q1Q2 generation period from a timing T1 to a timing T2, the charge signals Q1 and Q2 in the period are detected. First, the row scanning circuit 210 supplies reset signals RST to all the rows over a predetermined pulse period starting from the timing T1. The reset signal RST initializes charge accumulation amounts of the charge accumulating units 233 and 234 in all the rows. Furthermore, the row scanning circuit 210 initializes the charges of the light receiving elements 231 in all the rows by a FD selection signal SEL_FD.

Then, in the Q1Q2 generation period, the row scanning circuit 210 transfers the charges generated by the light receiving elements 231 in all the rows by the FD selection signal SEL_FD from 0° to 180° within the cycle of the light emission control signal CLKp to the charge accumulating unit 233. With this control, the received light amount p1 is accumulated in the charge accumulating unit 233.

Furthermore, in the Q1Q2 generation period, the row scanning circuit 210 transfers the charges generated by the light receiving elements 231 in all the rows by the FD selection signal SEL_FD from 180° to 360° within the cycle of the light emission control signal CLKp to the charge accumulating unit 234. With this control, the received light amount p2 is accumulated in the charge accumulating unit 234.

Then, at a timing T11 immediately before the timing T2, the row scanning circuit 210 sequentially supplies the FD read signals RD_FD1 and RD_FD2 to a first row. With this control, the charge signals Q1 and Q2 in the first row are read. Next, the row scanning circuit 210 sequentially supplies the FD read signals RD_FD1 and RD_FD2 to a second row to read the charge signal. Thereafter, similarly, the row scanning circuit 210 sequentially selects the rows and reads the charge signals.

In this way, in the Q1Q2 generation period, each of the pixels 230 generates the charge signal Q1 from 0° to 180° and the charge signal Q2 from 180° to 360°.

Figure 5:
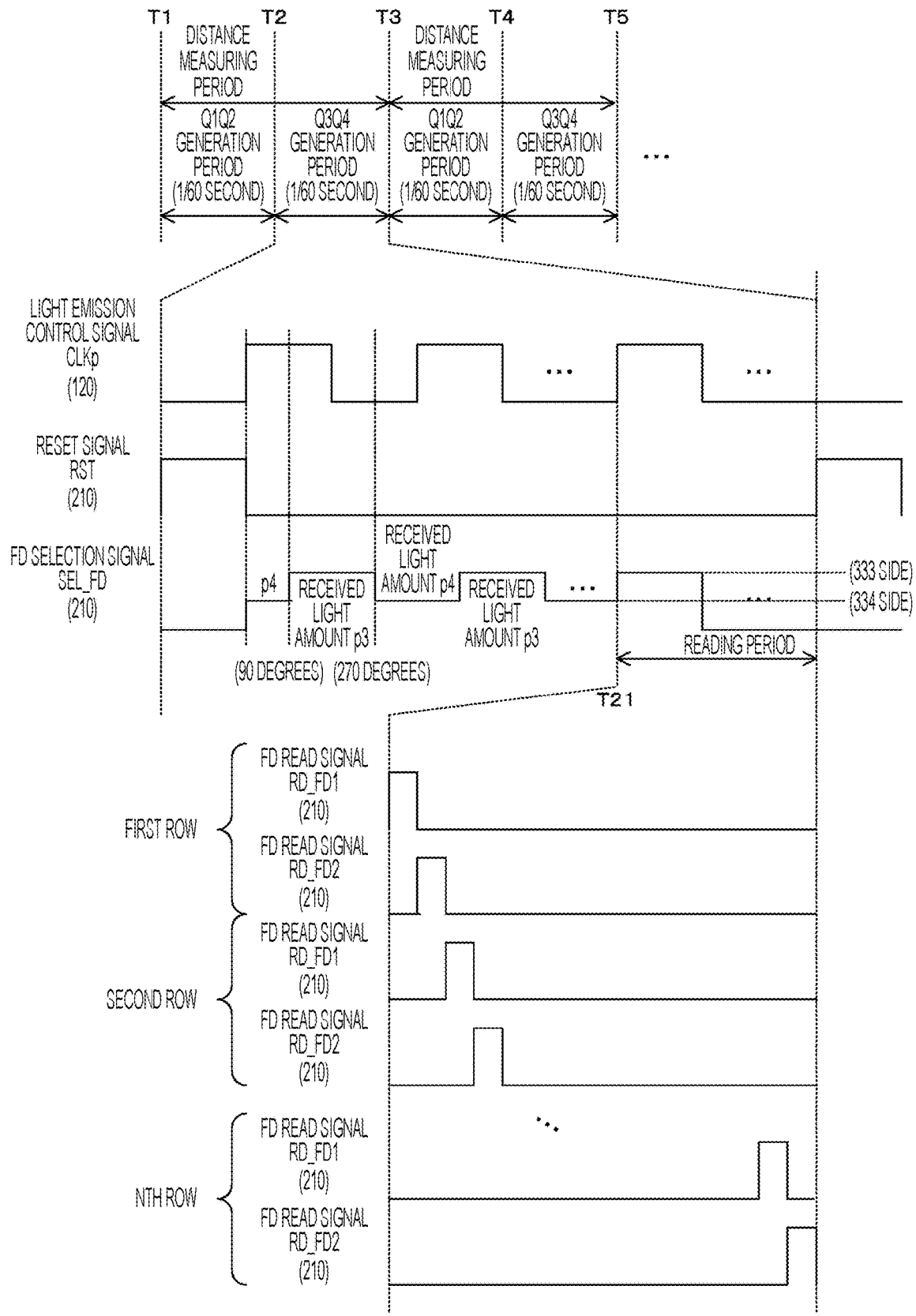
FIG. 5 is a timing chart of an exemplary operation of the solid-state imaging device in a Q3Q4 generation period according to the first embodiment of the present technology.

FIG. 5 is a timing chart of exemplary exposure control of the pixel 230 in the Q3Q4 generation period according to the first embodiment. For example, in the Q3Q4 generation period from the timing T2 to a timing T3, charge signals Q3 and Q4 in the period are generated. First, the row scanning circuit 210 supplies the reset signal RST to all the rows over a predetermined pulse period starting from the timing T2 and initializes the charge accumulation amounts of the charge accumulating units 233 and 234 in all the rows. Furthermore, the row scanning circuit 210 initializes the charges of the light receiving elements 231 in all the rows by a FD selection signal SEL_FD.

Then, in the initial 0° to 90°, the row scanning circuit 210 transfers the charges generated by the light receiving elements 231 in all the rows by the FD selection signal SEL_FD to the charge accumulating unit 234. With this control, the received light amount p4 is accumulated in the charge accumulating unit 234. After that, the row scanning circuit 210 transfers the charges generated by the light receiving elements 231 in all the rows by the FD selection signal SEL_FD from 90° to 270° within the cycle of the light emission control signal CLKp to the charge accumulating unit 233. With this control, the received light amount p3 is accumulated in the charge accumulating unit 233.

Furthermore, in the Q3Q4 generation period, the row scanning circuit 210 transfers the charges generated by the light receiving elements 231 in all the rows by the FD selection signal SEL_FD from 270° to 90° within the cycle of the light emission control signal CLKp to the charge accumulating unit 234. With this control, the received light amount p4 is accumulated in the charge accumulating unit 234.

Then, at a timing T21 immediately before the timing T3, the row scanning circuit 210 sequentially supplies the FD read signals RD_FD1 and RD_FD2 to the first row. With this control, the charge signals Q3 and Q4 in the first row are read. Thereafter, similarly, the row scanning circuit 210 sequentially selects the rows and reads the charge signals.

In this way, in the Q3Q4 generation period, each of the pixels 230 generates the charge signal Q3 from 90° to 270° and the charge signal Q4 from 270° to 90°.

[Exemplary Configuration of Distance Measurement Calculating Unit]

Figure 6:
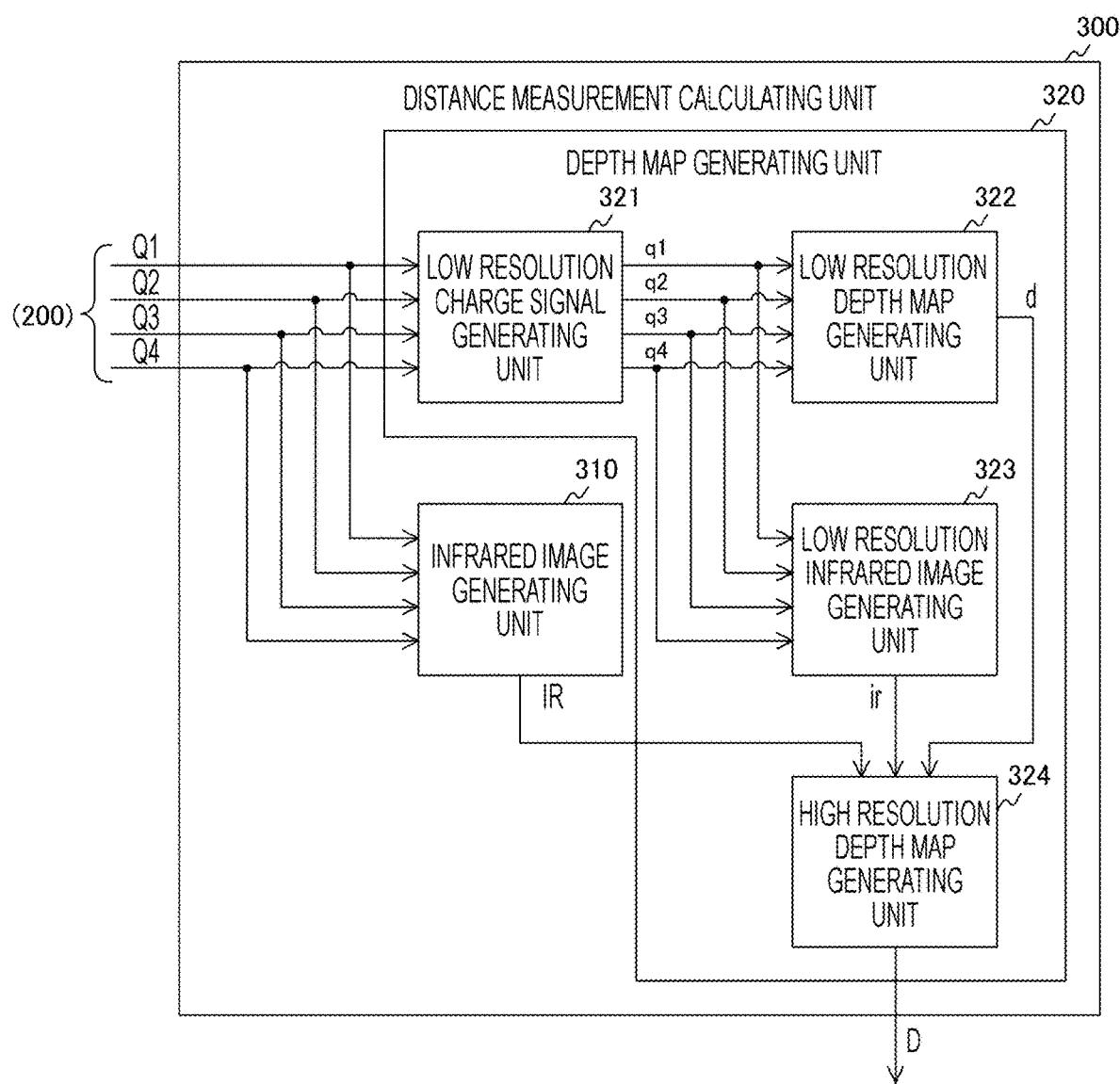
FIG. 6 is a block diagram of an exemplary configuration of a distance measurement calculating unit according to the first embodiment of the present technology.

FIG. 6 is a block diagram of an exemplary configuration of the distance measurement calculating unit 300 according to the first embodiment of the present technology. The distance measurement calculating unit 300 includes an infrared image generating unit 310 and a depth map generating unit 320. Furthermore, the depth map generating unit 320 includes a low resolution charge signal generating unit 321, a low resolution depth map generating unit 322, a low resolution infrared image generating unit 323, and a high resolution depth map generating unit 324.

The infrared image generating unit 310 generates infrared image data from each of the charge signals Q1 to Q4. Here, the infrared image data is image data in which a plurality of pieces of pixel data indicating a luminance IR of continuous infrared light (in other words, continuous light) is arranged in a two-dimensional lattice pattern. The infrared image generating unit 310 calculates the luminance IR of each pixel 230, for example, by the following formula.

$$IR = (Q1 + Q2 + Q3 + Q4)/2$$

The infrared image generating unit 310 outputs the calculated infrared image data to the high resolution depth map generating unit 324. Note that the infrared image generating unit 310 is an example of a continuous light image data generating unit described in Claims.

The low resolution charge signal generating unit 321 adds the charge signals in a pixel block for each pixel block (that is, pixel addition). Here, the pixel block is a region including a plurality of pixels, and the pixel array unit 220 is divided into, for example, a plurality of pixel blocks of 3×3 pixels. Furthermore, since the charge signals Q1 to Q4 are generated for each pixel, if the number of rows is M (M is an integer) and the number of columns is N (N is an integer), M×N charge signals Q1 are generated. Similarly, M×N charge signals Q2 to Q4 are generated.

Then, when it is assumed that the size of the pixel block be 3×3 pixels, in each pixel blocks, a signal obtained by averaging nine charge signals Q1 in the pixel block is calculated as a low resolution charge signal q1. In the entire image, (M×N)/9 low resolution charge signals q1 are calculated. Similarly, low resolution charge signals q2, q3 and q4 are calculated by respectively averaging the charge signals Q2, Q3 and Q4. The low resolution charge signal generating unit 321 supplies these low resolution charge signals to the low resolution depth map generating unit 322 and the low resolution infrared image generating unit 323. By performing the pixel addition by the low resolution charge signal generating unit 321, a noise of the charge signal can be reduced. However, the resolution of the depth map generated by the charge signal obtained by pixel addition is lowered than that before the pixel addition.

The low resolution depth map generating unit 322 measures a distance for each pixel block. The low resolution depth map generating unit 322 can calculate a distance d to the object corresponding to the pixel block by substituting the low resolution charge signals q1 to q4 into the following formula. A method of deriving the formula is described, for example, in "Larry Li, "Time-of-Flight Camera—An Introduction", Texas Instruments, Technical White Paper SLOA 190B January 2014 Revised May 2014.

$$d = (c/4\pi f) \times \tan^{-1}\{(q3 - q4)/(q1 - q2)\}$$
$$= (c/4\pi f) \times R$$

In the above formula, the unit of the distance d is, for example, meter (m). The reference c indicates a speed of light, and the unit of the speed c is, for example, meter per second (m/s). The reference $\tan^{-1}(\ )$ indicates an inverse function of the tangent function. The reference R indicates a phase, and the unit of the phase is, for example, "degree".

The low resolution depth map generating unit 322 generates data in which the information of the distance d of each of the pixel blocks is arranged as a low resolution depth map and supplies the data to the high resolution depth map generating unit 324.

The low resolution infrared image generating unit 323 integrates the low resolution charge signals q1 to q4 in the respective pixel blocks to calculate a luminance ir of infrared light (continuous light). The luminance ir is obtained, for example, by the following formula.

$$ir = (q1 + q2 + q3 + q4)/2$$

The low resolution infrared image generating unit 323 supplies image data, in which the luminance ir of each pixel block is arranged, to the high resolution depth map generating unit 324 as low resolution infrared image data. Note that the low resolution infrared image generating unit 323 is an example of a low resolution continuous light image data generating unit described in Claims.

The high resolution depth map generating unit 324 measures a distance (depth) for each pixel from the infrared image data, the low resolution infrared image data, and the low resolution depth map. The high resolution depth map generating unit 334 obtains a distance $D_{(u)}$ corresponding to a luminance $IR_{(u)}$ of the infrared image data at a coordinate u of the pixel of the ToF sensor 200 by using a relation between a distance $d_{(v)}$ of the low resolution depth map and a luminance $ir_{(v)}$ of the low resolution infrared image data. This process is performed, for example, by a cross-bilateral filter indicated in the following formula. This cross-bilateral filter is described, for example, in "J. Kopf and M. Uyttendaele, Joint bilateral upsampling, Transactions on Graphics (TOG), 26(3), 2007".

[Formula 1]

$$D_{(u)} = \frac{1}{k_{(u)}} \sum_{v \in \Omega_u} \{d_{(v)} \times f(\|u-v\|) \times g(\|IR_{(u)} - ir_{(v)}\|)\} \quad \text{Expression 1}$$

[Formula 2]

$$k_{(u)} \equiv \sum_{v \in \Omega_u} \{f(\|u-v\|) \times g(\|IR_{(u)} - ir_{(v)}\|)\} \quad \text{Expression 2}$$

Here, a set $\Omega_u$ represents the vicinity of the coordinate u. That is, with summation calculation on the right side of Expression 1, "a low resolution coordinate v" in the vicinity of the coordinate u of which the distance D is required is obtained. Furthermore, the references f( ) and g( ) indicate Gaussian functions. The left side of Expression 1 is a distance to be finally output.

The high resolution depth map generating unit 324 calculates the distances D of all the pixels and outputs data in which the distances D are arranged as a high resolution depth map.

In this way, by upsampling the low resolution depth map with the cross-bilateral filter, it is possible to generate a high resolution depth map of which the noise is reduced. Accordingly, the image quality of the depth map can be improved.

Note that the high resolution depth map generating unit 324 uses a cross-bilateral filter. However, the filter to be used is not limited to the cross-bilateral filter as long as the filter can be used for upsampling.

Figure 7:
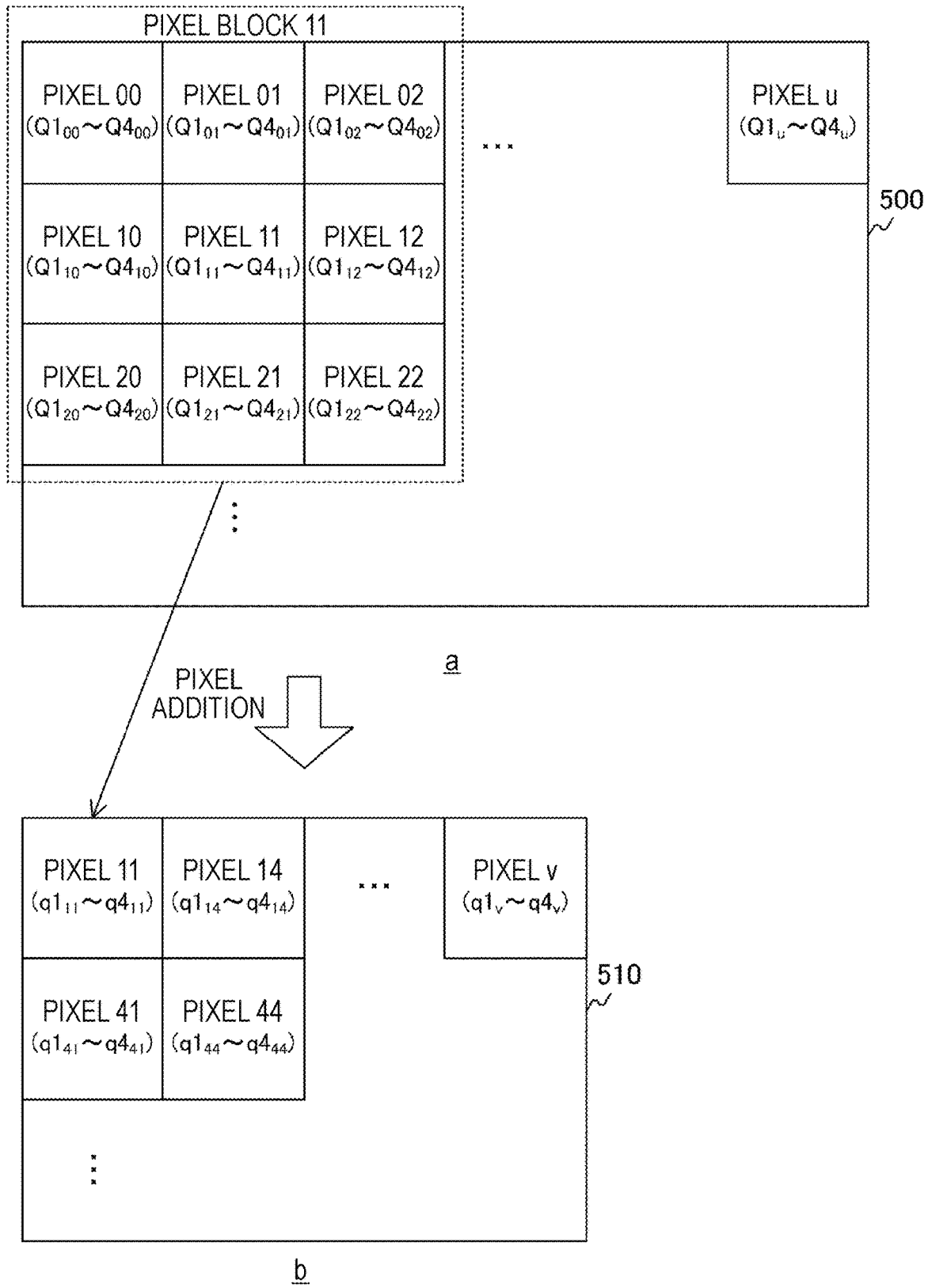
FIG. 7 is a diagram of an exemplary charge signal and low resolution charge signal according to the first embodiment of the present technology.

FIG. 7 is a diagram of exemplary charge signals and exemplary low resolution charge signals according to the first embodiment of the present technology. In a of FIG. 7, exemplary charge signals for each pixel are illustrated. In b of FIG. 7, exemplary low resolution charge signals for each pixel are illustrated.

For example, charge signals $Q1_{00}$ to $Q4_{00}$ are generated in a pixel 00 at a coordinate (0, 0), and charge signals $Q1_{01}$ to $Q4_{01}$ are generated in a pixel 01 at a coordinate (0, 1). Then, the pixel addition is performed in units of the pixel block of 3×3 pixels. For example, in a pixel block 11 having the center coordinate (1, 1), nine sets of charge signals Q1 to Q4 are averaged to generate a set of low resolution charge signals $q1_{11}$ to $q4_{11}$.

Figure 8:
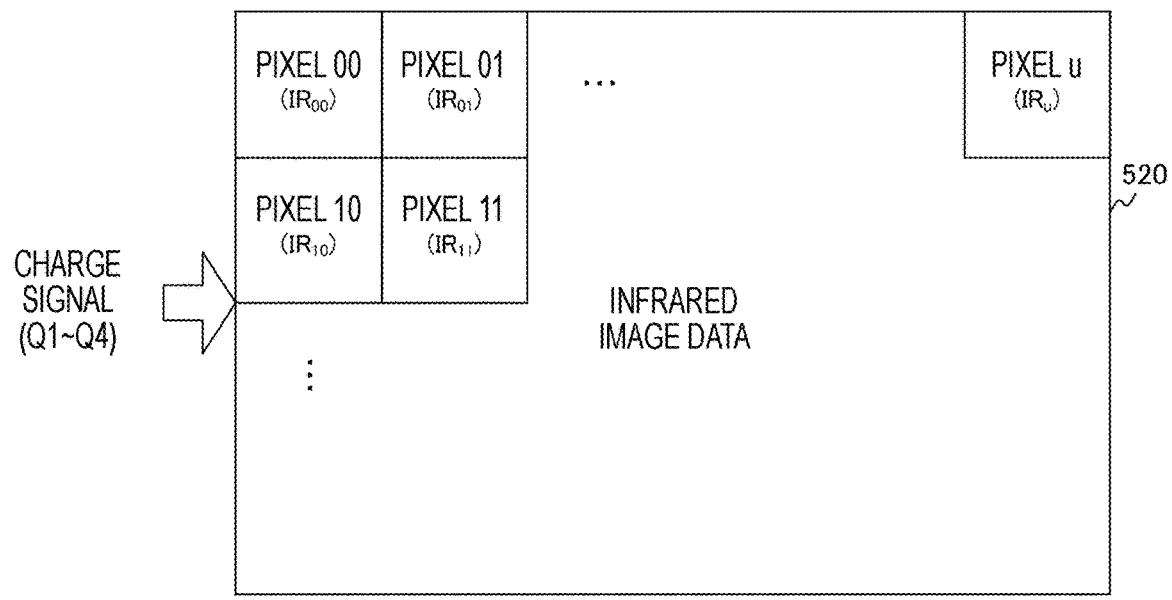
FIG. 8 is a diagram of exemplary infrared image data and low resolution infrared image data according to the first embodiment of the present technology.
Figure 8:
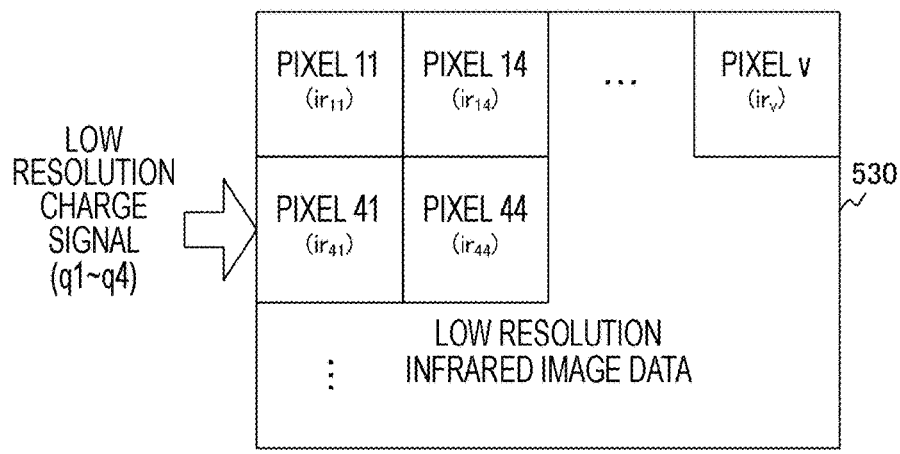

FIG. 8 is a diagram of exemplary infrared image data and low resolution infrared image data according to the first embodiment of the present technology. In a of FIG. 8, exemplary infrared image data is illustrated. In b of FIG. 8, exemplary low resolution image data is illustrated.

For each pixel, the charge signals Q1 to Q4 are integrated, and the luminance IR is calculated. For example, a luminance $IR_{00}$ of the pixel 00 is calculated by integrating the charge signals $Q1_{00}$ to $Q4_{00}$ of the pixel 00, and a luminance $IR_{01}$ of the pixel 01 is calculated by integrating the charge signals $Q1_{01}$ to $Q4_{01}$ of the pixel 01. Furthermore, regarding the center position of each pixel block, a luminance it is calculated by integrating the low resolution charge signals q1 to q4. For example, a luminance $IR_{11}$ of a pixel 11 is calculated by integrating charge signals $Q1_{11}$ to $Q4_{11}$ of the pixel 11.

Figure 9:
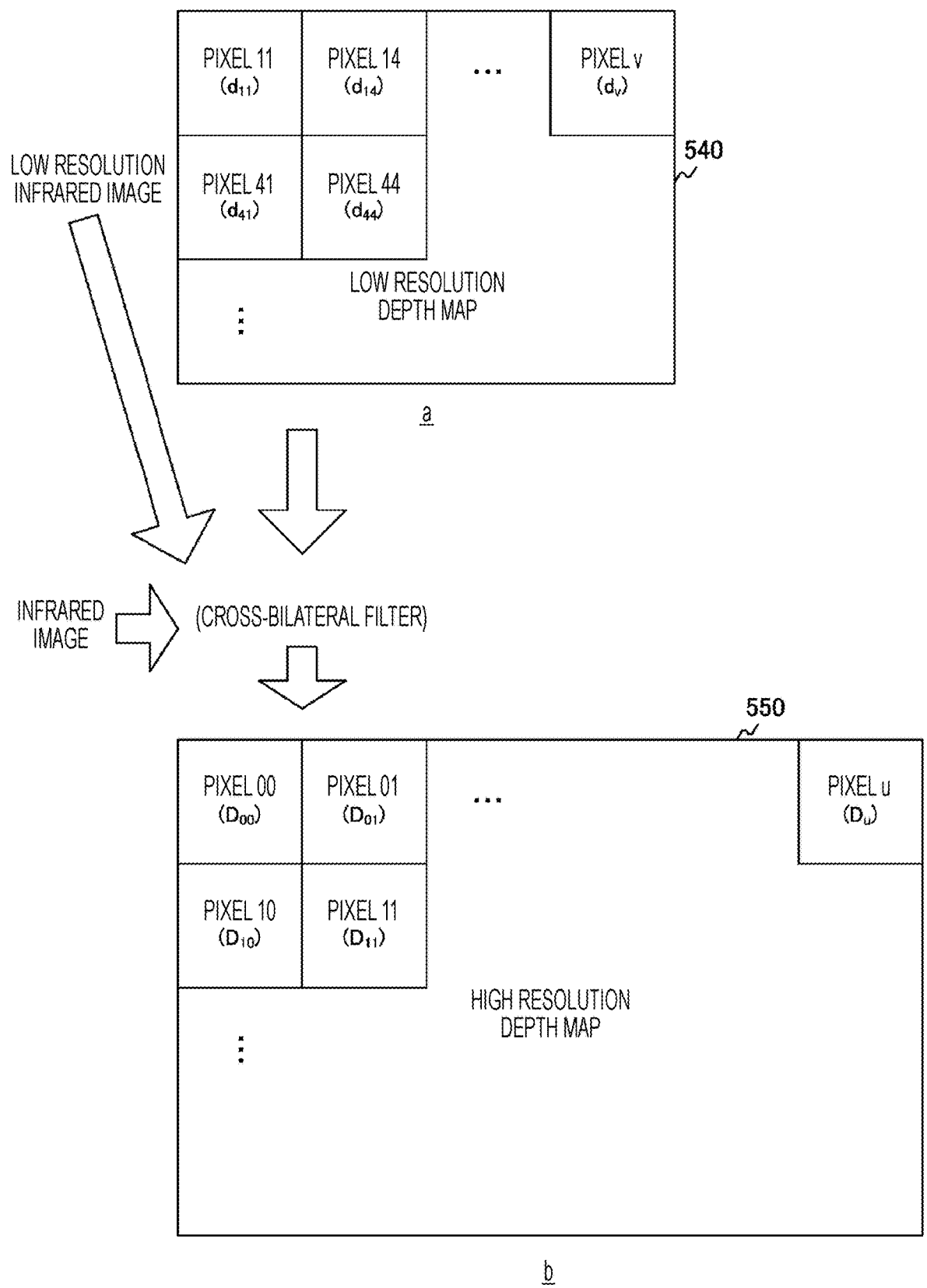
FIG. 9 is a diagram of an exemplary low resolution depth map and an exemplary high resolution depth map according to the first embodiment of the present technology.

FIG. 9 is a diagram of an exemplary low resolution depth map and an exemplary high resolution depth map according to the first embodiment of the present technology. In a of FIG. 9, an exemplary low resolution depth map is illustrated. In b of FIG. 9, an exemplary high resolution depth map is illustrated.

For each center of the pixel block, the distance d is calculated from the low resolution charge signals q1 to q4. For example, from low resolution charge signals $q1_{11}$ to $q4_{11}$ of the pixel 11, a distance $d_{11}$ corresponding to the pixel 11 is calculated.

Then, the low resolution infrared image data, the infrared image data, and the low resolution depth map are input to the cross-bilateral filter, and a high resolution depth map is generated.

[Exemplary Operation of Distance Measuring Module]

Figure 10:
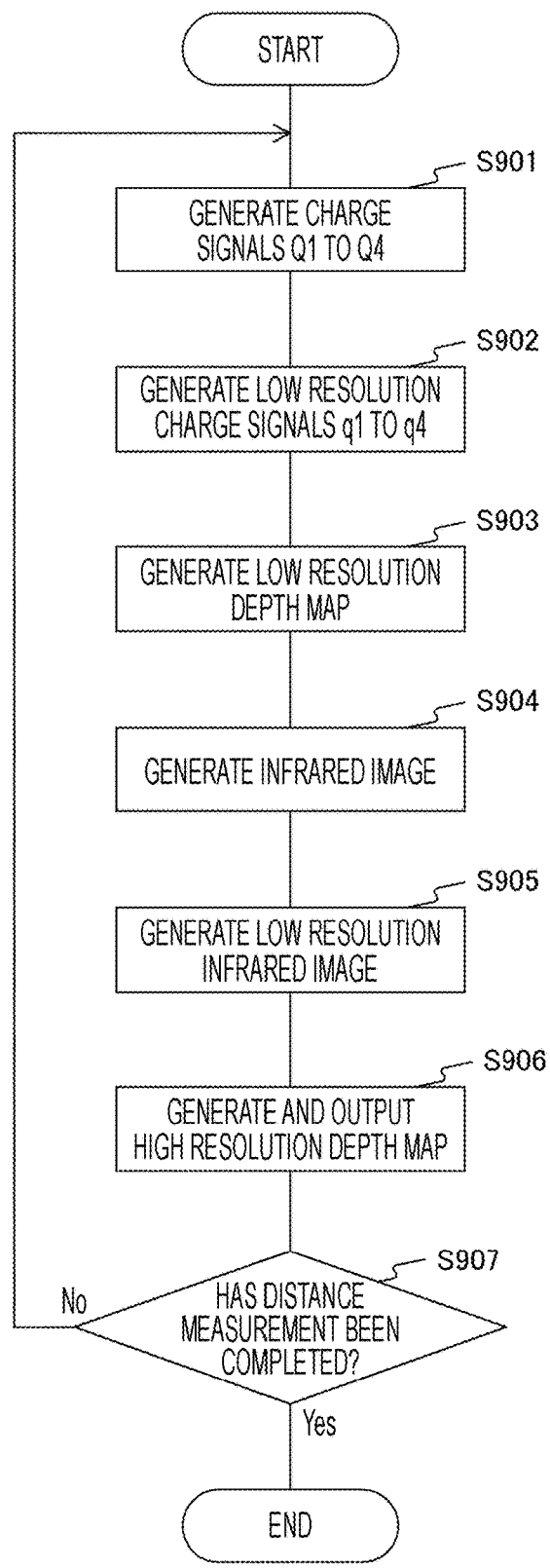
FIG. 10 is a flowchart of an exemplary operation of the distance measuring module according to the first embodiment of the present technology.

FIG. 10 is a flowchart of an exemplary operation of the distance measuring module 100 according to the first embodiment of the present technology. The operation is started, for example, when an operation for starting distance measurement is performed.

The distance measuring module 100 generates the charge signals Q1 to Q4 for each pixel (step S901). Then, the distance measuring module 100 generates the low resolution charge signals q1 to q4 for each pixel block by pixel addition (step S902). Next, the distance measuring module 100 generates a low resolution depth map from the low resolution charge signals q1 to q4 (step S903).

Furthermore, the distance measuring module 100 generates infrared image data from the charge signals Q1 to Q4 (step S904) and generates low resolution infrared image data from the low resolution charge signals q1 to q4 (step S905). Then, the distance measuring module 100 inputs the low resolution depth map, the infrared image data, and the low resolution infrared image data to the cross-bilateral filter to generate a high resolution depth map (step S906).

Then, the distance measuring module 100 determines whether the distance measurement has been completed according to an operation and the like for terminating the distance measurement (step S907). In a case where the distance measurement has not been completed (step S907: No), the distance measuring module 100 repeatedly executes the processing in step S901 and subsequent steps. On the other hand, in a case where the distance measurement has been completed (step S907: Yes), the distance measuring module 100 terminates the operation for generating the depth map.

In this way, according to the first embodiment of the present technology, the distance measuring module 100 generates the infrared image data from the charge signals and generates the high resolution depth map from the infrared image data and the charge signals. Therefore, the image quality of the depth map can be improved. Furthermore, since the infrared image data is generated from the charge signal output from the ToF sensor 200, it is not necessary to add a solid-state imaging device which captures the infrared image data. Therefore, in comparison with the configuration further including the solid-state imaging device, an increase in cost and size of the distance measuring module 100 can be suppressed. In addition, in the configuration in which the solid-state imaging device is added, the ToF sensor and the solid-state imaging device cannot be physically placed at the same position. Therefore, a positional difference between the solid-state imaging device and the ToF sensor is caused, and it is necessary to correct the positional difference. On the other hand, in the configuration using only the ToF sensor, such correction is not required.

[Modification]

In the first embodiment, the distance measuring module 100 generates the infrared image data by integrating the charge signals. However, it is possible that the ToF sensor 200 generates the charge signals and captures the infrared image data by time division. The distance measuring module 100 according to the modification of the first embodiment is different from that in the first embodiment in that the ToF sensor 200 generates the charge signals and captures the infrared image data by time division.

Figure 11:
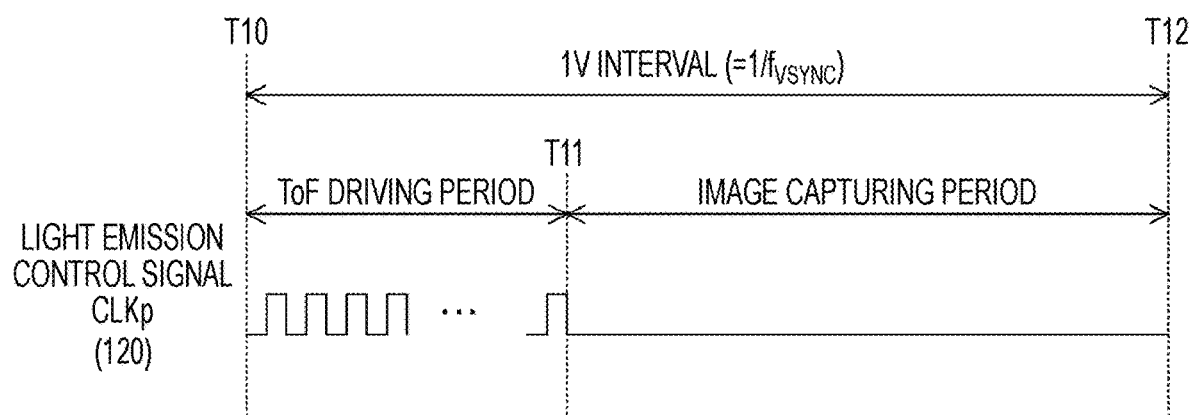
FIG. 11 is a timing chart of an exemplary operation of a light emission controlling unit according to a modification of the first embodiment of the present technology.

FIG. 11 is a timing chart of an exemplary operation of the light emission controlling unit 120 according to the modification of the first embodiment of the present technology. In the modification of the first embodiment, a 1V interval, which is a reciprocal of a frequency $f_{VSYNC}$ of the vertical synchronization signal VSYNC, is divided into a ToF driving period and an image capturing period. The light emission controlling unit 120 generates a light emission control signal CLKp in the ToF driving period, and the light emitting unit 110 intermittently emits light in synchronization with the signal. On the other hand, in the image capturing period, the light emission controlling unit 120 stops the light emission control signal CLKp, and the light emitting unit 110 stops light emission. Since the light emission control signal CLKp is stopped, in the pixel 230 illustrated in FIG. 3, the transfer switch 232 is not switched, and charges are accumulated in only one of the charge accumulating units 233 and 234.

Furthermore, the ToF sensor 200 receives the intermittent light in the ToF driving period to generate the charge signals Q1 to Q4 and receives the continuous infrared light in the image capturing period to generate the infrared image data.

Figure 12:
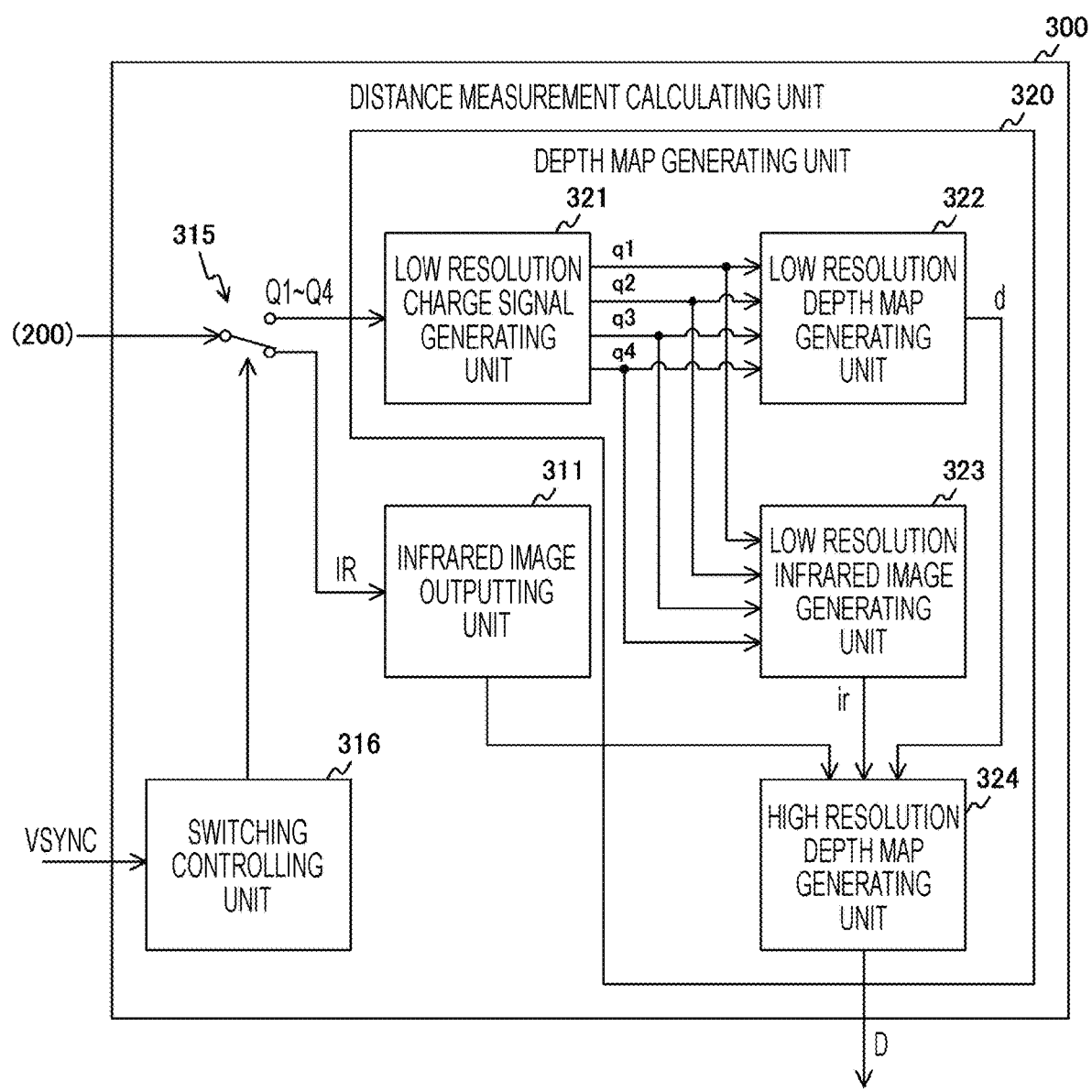
FIG. 12 is a block diagram of an exemplary configuration of a distance measurement calculating unit according to the modification of the first embodiment of the present technology.

FIG. 12 is a block diagram of an exemplary configuration of the distance measurement calculating unit 300 according to the modification of the first embodiment of the present technology. The distance measurement calculating unit 300 according to the modification of the first embodiment is different from that in the first embodiment in that the distance measurement calculating unit 300 includes an infrared image outputting unit 311 instead of the infrared image generating unit 310 and further includes a switch 315 and a switching controlling unit 316.

The switching controlling unit 316 switches an output destination of data from the ToF sensor 200. In the ToF driving period, the switching controlling unit 316 switches the output destination of the charge signals Q1 to Q4 from the ToF sensor 200 to the depth map generating unit 320. On the other hand, in the image capturing period, the switching controlling unit 316 switches the output destination of the infrared image data from the ToF sensor 200 to the infrared image generating unit 311 and the outside.

The infrared image outputting unit 311 performs various image processing on the infrared image data from the ToF sensor 200 as necessary, and outputs the processed data to the high resolution depth map generating unit 324.

As described above, according to the first modification of the first embodiment of the present technology, since the ToF sensor 200 generates the charge signals and captures the infrared image data by time division, the infrared image data can be generated without integrating the charge signals.

2. Second Embodiment

In the first embodiment described above, the cross-bilateral filter has upsampled the low resolution depth map. However, instead of the low resolution depth map, the low resolution charge signal can be upsampled. A distance measuring module 100 according to a second embodiment is different from that in the first embodiment in that the low resolution charge signal is upsampled.

Figure 13:
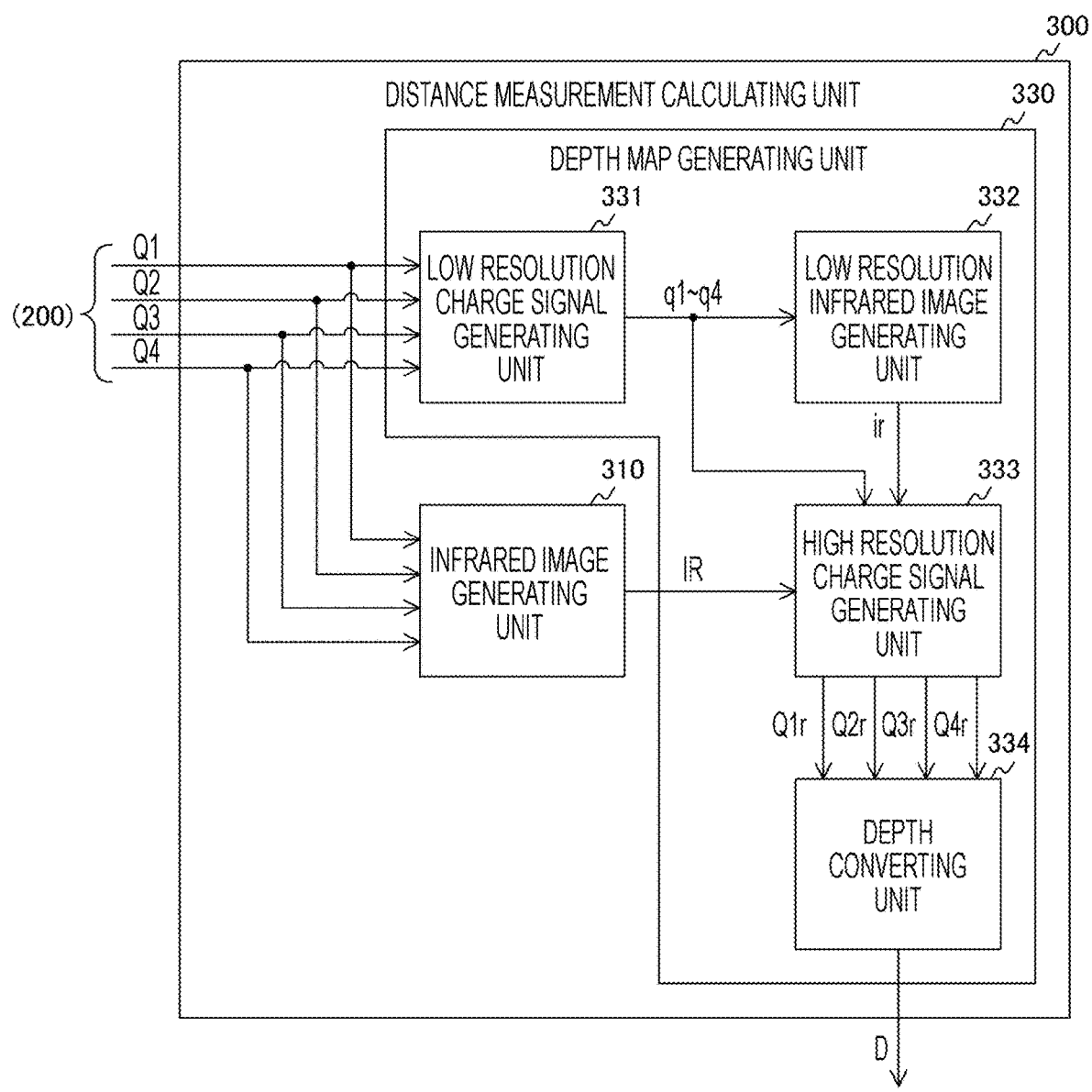
FIG. 13 is a block diagram of an exemplary configuration of a distance measurement calculating unit according to a second embodiment of the present technology.

FIG. 13 is a block diagram of an exemplary configuration of the distance measurement calculating unit 300 according to the second embodiment of the present technology. The distance measurement calculating unit 300 according to the second embodiment includes a depth map generating unit 330 instead of the depth map generating unit 320. The depth map generating unit 330 includes a low resolution charge signal generating unit 331, a low resolution infrared image generating unit 332, a high resolution charge signal generating unit 333, and a depth converting unit 334.

The configurations of the low resolution charge signal generating unit 331 and the low resolution infrared image generating unit 332 are similar to the configurations of the low resolution charge signal generating unit 321 and the low resolution infrared image generating unit 323 according to the first embodiment.

The high resolution charge signal generating unit 333 generates new charge signals $Q1_r$ to $Q4_r$ for each pixel as high resolution charge signals from the low resolution charge signals q1 to q4, the low resolution infrared image data, and the low infrared image data. The high resolution charge signals $Q1_r$ to $Q4_r$ are calculated, for example, by a cross-bilateral filter indicated by the following formula.

[Formula 3]
$$Q1_{r(u)} = \frac{1}{k_{(u)}} \sum_{v \in \Omega_u} \{q1_{(v)} \times f(\|u-v\|) \times g(\|IR_{(u)} - ir_{(v)}\|)\} \quad \text{Expression 3}$$

[Formula 4]
$$Q2_{r(u)} = \frac{1}{k_{(u)}} \sum_{v \in \Omega_u} \{q2_{(v)} \times f(\|u-v\|) \times g(\|IR_{(u)} - ir_{(v)}\|)\} \quad \text{Expression 4}$$

[Formula 5]
$$Q3_{r(u)} = \frac{1}{k_{(u)}} \sum_{v \in \Omega_u} \{q3_{(v)} \times f(\|u-v\|) \times g(\|IR_{(u)} - ir_{(v)}\|)\} \quad \text{Expression 5}$$

[Formula 6]
$$Q4_{r(u)} = \frac{1}{k_{(u)}} \sum_{v \in \Omega_u} \{q4_{(v)} \times f(\|u-v\|) \times g(\|IR_{(u)} - ir_{(v)}\|)\} \quad \text{Expression 6}$$

In the above formulas, the references $q1_{(v)}$ to $q4_{(v)}$ indicate low resolution charge signals of a coordinate v. Furthermore, the references $Q1_{r(u)}$ to $Q4_{r(u)}$ indicate high resolution charge signals of a coordinate u. The high resolution charge signal generating unit 333 supplies the calculated high resolution charge signals $Q1_r$ to $Q4_r$ to the depth converting unit 334.

As described above, in the first embodiment, the cross-bilateral filter has upsampled the low resolution depth map. Whereas, in the second embodiment, the cross-bilateral filter upsamples the low resolution charge signal.

The depth converting unit 334 converts the high resolution charge signals $Q1_r$ to $Q4_r$ of the pixel into a distance D (depth) for each pixel. The depth converting unit 334 calculates the distance D, for example, by using the following formula. Then, the depth converting unit 334 outputs a depth map in which the calculated distances D are arranged to the outside.

$$D=(c/4\pi f)\times\tan^{-1}\{(Q3_r-Q4_r)/(Q1_r-Q2_r)\}$$

In the above formula, a subscript (u) is omitted.

Note that the high resolution charge signal generating unit 333 has calculated the high resolution charge signals $Q1_r$ to $Q4_r$ according to Formulas 3 to 6. However, the high resolution charge signal generating unit 333 may calculate the above charge signals according to the following formulas instead of Formulas 3 to 6.

[Formula 7]

$$Q1_{r(u)} - Q2_{r(u)} = \frac{1}{k_{(u)}} \sum_{v \in \Omega_u} \{(q1_{(v)} - q2_{(v)}) \times f(\|u-v\|) \times g(\|IR_{(u)} - ir_{(v)}\|)\} \quad \text{Expression 7}$$

[Formula 8]

$$Q3_{r(u)} - Q4_{r(u)} = \frac{1}{k_{(u)}} \sum_{v \in \Omega_u} \{(q3_{(v)} - q4_{(v)}) \times f(\|u-v\|) \times g(\|IR_{(u)} - ir_{(v)}\|)\} \quad \text{Expression 8}$$

Since the depth converting unit 334 in the subsequent stage uses $Q1_{r(u)}-Q2_{r(u)}$ and $Q3_{r(u)}-Q4_{r(u)}$ as described above, it is preferable that the high resolution charge signal generating unit 333 supply the calculation results to the depth converting unit 334. By using Formulas 7 and 8, it is possible to reduce the amount of calculation than a case of using Formulas 3 to 6.

Figure 14:
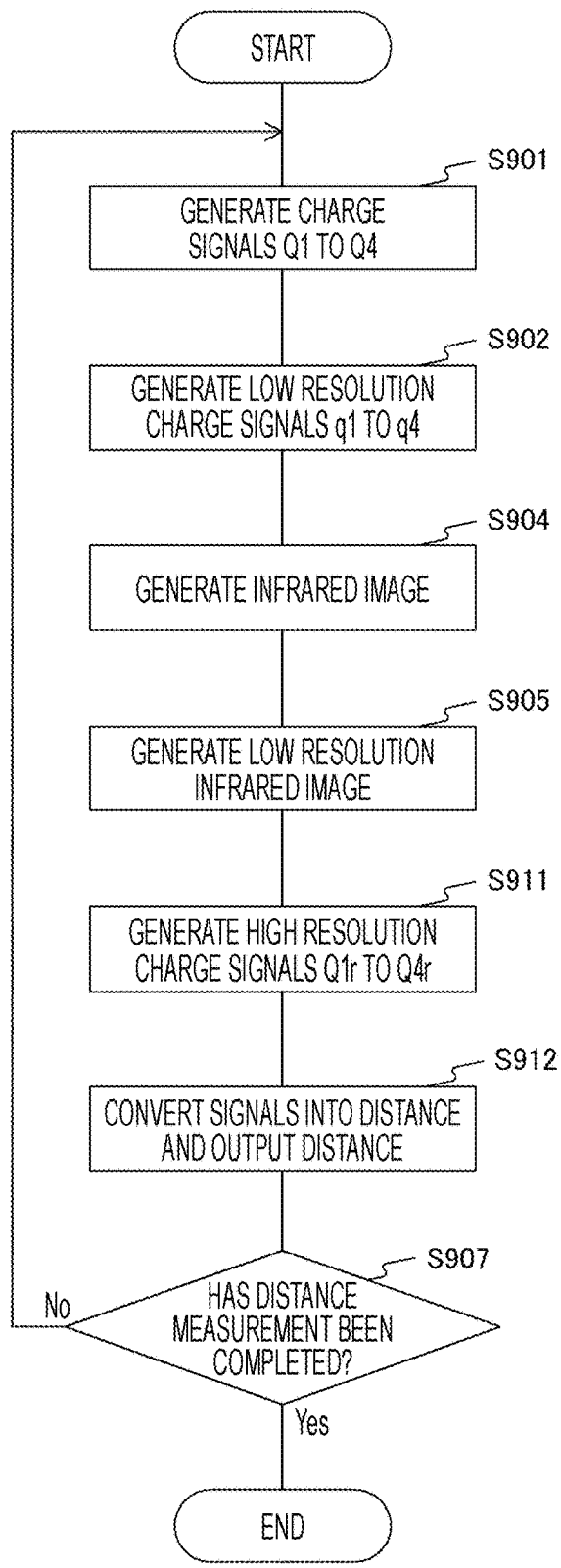
FIG. 14 is a flowchart of an exemplary operation of a distance measuring module according to the second embodiment of the present technology.

FIG. 14 is a flowchart of an exemplary operation of a distance measuring module 100 according to the second embodiment of the present technology. The distance measuring module 100 generates charge signals Q1 to Q4 for each pixel (step S901) and generates low resolution charge signals q1 to q4 for each pixel block (step S902). Then, the distance measuring module 100 generates the infrared image data (step S904) and generates the low resolution infrared image data (step S905).

Subsequently, the distance measuring module 100 inputs the low resolution charge signals q1 to q4, the low resolution infrared image data, and the infrared image data to the cross-bilateral filter to generate the high resolution charge signals $Q1_r$ to $Q4_r$ (step S911). Then, the distance measuring module 100 converts the high resolution charge signals $Q1_r$ to $Q4_r$ into the distance D to generate and output the depth map (step S912). After step S912, the distance measuring module 100 executes processing in step S907 and the subsequent steps.

As described above, according to the second embodiment of the present technology, the low resolution charge signal is input to the cross-bilateral filter to generate the high resolution charge signals. Therefore, the high resolution depth map can be generated from the high resolution charge signals.

3. Third Embodiment

In the first embodiment described above, the distance measuring module 100 has removed noises by the pixel addition. However, noises can be removed with a cross-bilateral filter instead of the pixel addition. A distance measuring module 100 according to a third embodiment is different from that in the first embodiment in that the noises are removed with the cross-bilateral filter.

Figure 15:
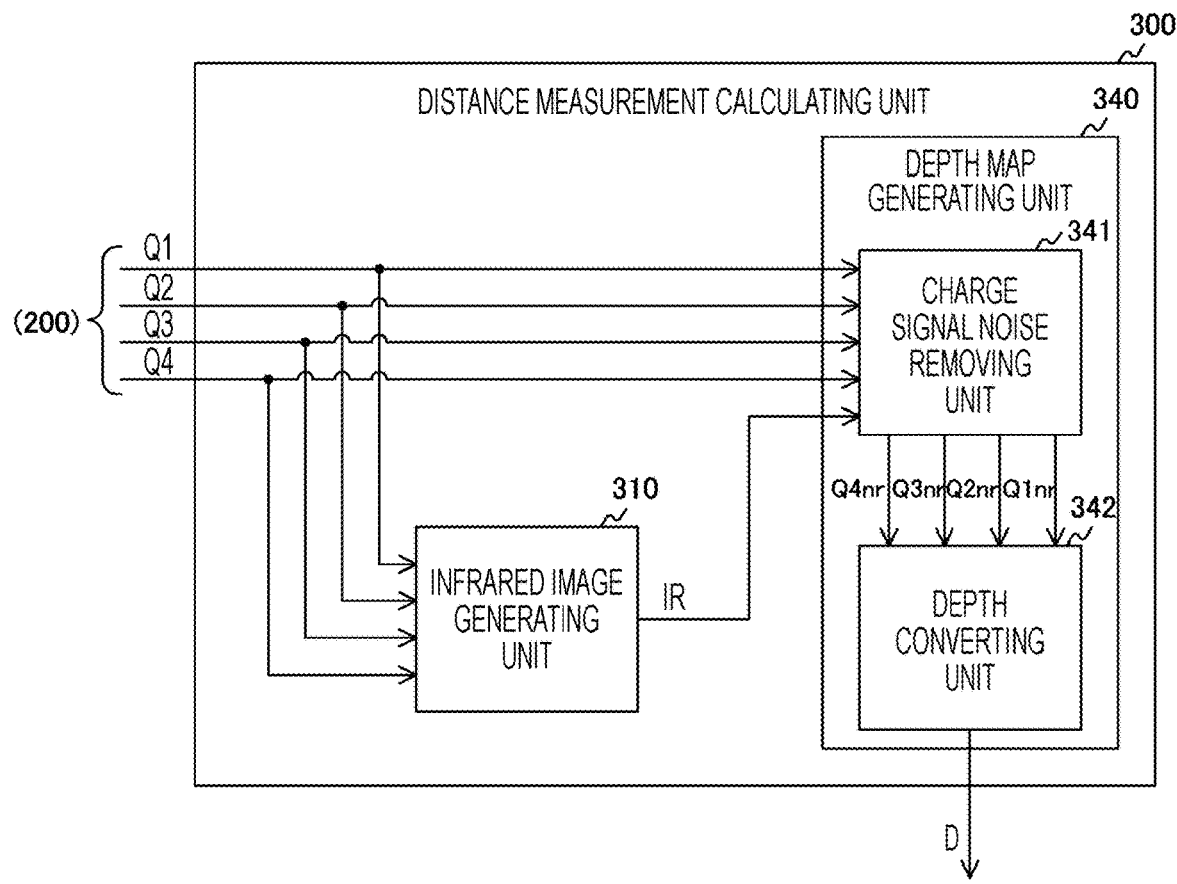
FIG. 15 is a block diagram of an exemplary configuration of a distance measurement calculating unit according to a third embodiment of the present technology.

FIG. 15 is a block diagram of an exemplary configuration of a distance measurement calculating unit 300 according to the third embodiment of the present technology. The distance measurement calculating unit 300 according to the third embodiment is different from that in the first embodiment in that a depth map generating unit 340 is included instead of the depth map generating unit 320.

The depth map generating unit 340 includes a charge signal noise removing unit 341 and a depth converting unit 342. The configuration of the depth converting unit 342 is similar to that of the depth converting unit 334 according to the second embodiment.

The charge signal noise removing unit 341 inputs infrared image data as a guidance image together with charge signals Q1 to Q4 to the cross-bilateral filter to remove noises of the charge signals Q1 to Q4. The charge signal noise removing unit 341 supplies charge signals $Q1_{nr}$ to $Q4_{nr}$ from which the noises have been removed to the depth converting unit 342. The charge signals $Q1_{nr}$ to $Q4_{nr}$ are calculated, for example, by the cross-bilateral filter indicated by the following formulas.

[Formula 9]

$$Q1_{nr(u)} = \frac{1}{k'_{(u)}} \sum_{u' \in \Omega_u} \{Q1_{(u')} \times f(\|u-u'\|) \times g(\|IR_{(u)} - IR_{(u')}\|) \times \\ h(\|(Q1_{(u')} + Q2_{(u')}) - (Q3_{(u')} + Q4_{(u')})\|) \times \\ m\big(\sqrt{(Q1_{(u')} - Q2_{(u')})^2 + (Q3_{(u')} - Q4_{(u')})^2}\big)\} \quad \text{Expression 9}$$

[Formula 10]

$$Q2_{nr(u)} = \frac{1}{k'_{(u)}} \sum_{u' \in \Omega_u} \{Q2_{(u')} \times f(\|u-u'\|) \times g(\|IR_{(u)} - IR_{(u')}\|) \times \\ h(\|(Q1_{(u')} + Q2_{(u')}) - (Q3_{(u')} + Q4_{(u')})\|) \times \\ m\big(\sqrt{(Q1_{(u')} - Q2_{(u')})^2 + (Q3_{(u')} - Q4_{(u')})^2}\big)\} \quad \text{Expression 10}$$

[Formula 11]

$$Q3_{nr(u)} = \frac{1}{k'_{(u)}} \sum_{u' \in \Omega_u} \{Q3_{(u')} \times f(\|u-u'\|) \times g(\|IR_{(u)} - IR_{(u')}\|) \times \\ h(\|(Q1_{(u')} + Q2_{(u')}) - (Q3_{(u')} + Q4_{(u')})\|) \times \\ m\big(\sqrt{(Q1_{(u')} - Q2_{(u')})^2 + (Q3_{(u')} - Q4_{(u')})^2}\big)\} \quad \text{Expression 11}$$

-continued

[Formula 12]

$$Q4_{nr(u)} = \frac{1}{k'_{(u)}} \sum_{u' \in \Omega_u} \{Q4_{(u')} \times f(\|u - u'\|) \times g(\|IR_{(u)} - IR_{(u')}\|) \times$$
$$h(|(Q1_{(u')} + Q2_{(u')}) - (Q3_{(u')} + Q4_{(u')})|) \times$$
$$m\left(\sqrt{(Q1_{(u')} - Q2_{(u')})^2 + (Q3_{(u')} - Q4_{(u')})^2}\right)\}$$

Expression 12

[Formula 13]

$$k'_{(u)} \equiv \sum_{u' \in \Omega_u} \{f(\|u - u'\|) \times g(\|IR_{(u)} - IR_{(u')}\|) \times$$
$$h(|(Q1_{(u')} + Q2_{(u')}) - (Q3_{(u')} + Q4_{(u')})|) \times$$
$$m\left(\sqrt{(Q1_{(u')} - Q2_{(u')})^2 + (Q3_{(u')} - Q4_{(u')})^2}\right)\}$$

Expression 13

In the above formulas, the reference u indicates a coordinate of a pixel where the charge signals ($Q1_{nr}$ to $Q4_{nr}$) from which the noises have been removed are output. Furthermore, the reference u' indicates a coordinate of a pixel in the vicinity of the coordinate u. The number of coordinates u' (filter size) required for the single coordinate u is appropriately set. For example, the coordinate u' of each of 3×3 pixels around the coordinate u is input.

Furthermore, the reference $IR_{(u)}$ indicates a luminance of the coordinate u, and the reference $IR_{(u')}$ indicates a luminance of the coordinate u'. The reference h( ) is a function that returns a larger weighting coefficient as an absolute difference value between the sum of charge signals Q1 and Q2 and the sum of charge signals Q3 and Q4 is smaller. The reference m( ) is a function that returns a larger weighting coefficient as a square root of the sum pf a square of a difference between the charge signals $Q1_{(u')}$ and $Q2_{(u')}$ and a square of a difference between the charge signals $Q3_{(u')}$ and $Q4_{(u')}$ is larger.

The noises of the charge signals Q1 to Q4 are removed by the cross-bilateral filter indicated in Expressions 9 to 13. In this way, the cross-bilateral filter has been used for upsampling in the first embodiment. Whereas, the cross-bilateral filter is used to remove the noises in the third embodiment. Note that, although h( ) and m( ) are multiplied in Expressions 9 to 13, at least one of the references h( ) and m( ) may be set to "one".

Furthermore, in Expressions 9 to 12, the Gaussian function g( ) is expressed by the following formula.

[Formula 14]

$$g(\|IR_{(u)} - IR_{(u')}\|) \equiv \frac{1}{\sqrt{2\pi}\,\sigma} \exp\left\{-\frac{1}{2}\left(\frac{\|IR_{(u)} - IR_{(u')}\|}{\sigma \times W_{u,u'}}\right)^2\right\}$$

Expression 14

In the above formula, the reference $W_{u,u'}$ is a function that returns a smaller weighting coefficient as a phase difference dR expressed by the following formula is larger. The phase difference dR is a difference between a phase obtained from the charge signals $Q1_{(u)}$ to $Q4_{(u)}$ corresponding to the coordinate u and a phase obtained from the charge signals $Q1_{(u')}$ to $Q4_{(u')}$ corresponding to the coordinates u'. The phase difference dR is expressed, for example, by the following formula.

$$Dr = \|R - R'\|$$

$$R = \tan^{-1}(Q3_{(u)} - Q4_{(u)})/(Q1_{(u)} - Q2_{(u)})$$

$$R' = \tan^{-1}(Q3_{(u')} - Q4_{(u')})/(Q1_{(u')} - Q2_{(u')})$$

It should be noted that Expression 14 is the Gaussian function for multiplying the standard deviation by the function $W_{u,u'}$. However, a general Gaussian function in which "one" is set instead of the function $W_{u,u'}$ may be used as g( ).

Furthermore, the charge signal noise removing unit 341 calculates the charge signals $Q1_{nr}$ to $Q4_{nr}$ by Expressions 9 to 12. However, the charge signal noise removing unit 341 may calculate the charge signals $Q1_{nr}$ to $Q4_{nr}$ by other formulas instead of Expressions 9 to 12.

[Formula 15]

$$Q1_{nr(u)} - Q2_{nr(u)} =$$
$$\frac{1}{k'_{(u)}} \sum_{u' \in \Omega_u} \{(Q1_{(u')} - Q2_{nr(u)}) \times f(\|u - u'\|) \times$$
$$g(\|IR_{(u)} - IR_{(u')}\|) \times$$
$$h(|(Q1_{(u')} + Q2_{(u')}) - (Q3_{(u')} + Q4_{(u')})|) \times$$
$$m\left(\sqrt{(Q1_{(u')} - Q2_{(u')})^2 + (Q3_{(u')} - Q4_{(u')})^2}\right)\}$$

Expression 15

[Formula 16]

$$Q3_{nr(u)} - Q4_{nr(u)} =$$
$$\frac{1}{k'_{(u)}} \sum_{u' \in \Omega_u} \{(Q3_{(u')} - Q4_{nr(u)}) \times f(\|u - u'\|) \times$$
$$g(\|IR_{(u)} - IR_{(u')}\|) \times$$
$$h(|(Q1_{(u')} + Q2_{(u')}) - (Q3_{(u')} + Q4_{(u')})|) \times$$
$$m\left(\sqrt{(Q1_{(u')} - Q2_{(u')})^2 + (Q3_{(u')} - Q4_{(u')})^2}\right)\}$$

Expression 16

By using Formulas 15 and 16, it is possible to reduce the amount of calculation than a case of using Formulas 9 to 12.

Furthermore, the charge signal noise removing unit 341 removes the noises of the charge signals by the cross-bilateral filter. However, the noise can be removed by processing other than filter processing. For example, the charge signal noise removing unit 341 may remove the noises by solving the energy minimization problem. In this case, a condition indicated in the following formula is set.

[Formula 17]

$$Q1'_{(u)} + Q2'_{(u)} = Q3'_{(u)} + Q4'_{(u)} \text{ for } \forall u \in \Omega$$

Expression 17

In the above formula, "for" and the subsequent terms indicate that the coordinate u is one of the set of the coordinates of all the pixels of a pixel array unit 220. Under the condition of Expression 17, the charge signals $Q1_{nr}$ to $Q4_{nr}$ are obtained by solving the following formula.

[Formula 18]

$$\{Qi_{nr(u)} \mid i = 1, 2, 3, 4.\ u \in \Omega\} =$$
$$\underset{\{Qi'_{(u)} \mid i=1,2,3,4.\ u \in \Omega\}}{\arg\min} (dTerm + A \times rTerm)$$

Expression 18

The reference A in the above formula is a predetermined coefficient. Furthermore, the reference dTerm is a data term, and the reference rTerm is a smooth term. These terms are expressed by the following formulas.

[Formula 19]

$$dTerm \equiv \sum_{u \in \Omega} \{(Q1'_{(u)} - Q1_{(u)})^2 + (Q2'_{(u)} - Q2_{(u)})^2 + (Q3'_{(u)} - Q3_{(u)})^2 + (Q4'_{(u)} - Q4_{(u)})^2\} \quad \text{Expression 19}$$

[Formula 20]

$$rTerm \equiv \sum_{u \in \Omega} \{\|T^{1/2}_{(u)} \nabla Q1'_{(u)}\| + \|T^{1/2}_{(u)} \nabla Q2'_{(u)}\| + \|T^{1/2}_{(u)} \nabla Q3'_{(u)}\| + \|T^{1/2}_{(u)} \nabla Q4'_{(u)}\|\} \quad \text{Expression 20}$$

[Formula 21]

$$T^{1/2}_{(u)} \equiv \exp(-B\|\nabla IR_{(u)}\|^r) n_{(u)} n^t_{(u)} + m_{(u)} m^t_{(u)} \quad \text{Expression 21}$$

The reference $n_{(u)}$ in Expression 21 is a unit vector indicating a direction of a gradient at the coordinate u of the infrared image data, and the reference $m_{(u)}$ is a unit vector orthogonal to the unit vector $n_{(u)}$. Furthermore, the function $T^{1/2}$ is an anisotropic diffusion tensor. This anisotropic diffusion tensor is described in "D. Ferstl, Image Guided Depth Upsampling Using Anisotropic Total Generalized Variation, ICCV 2013". The references A, B and r indicate desired constants.

Figure 16:
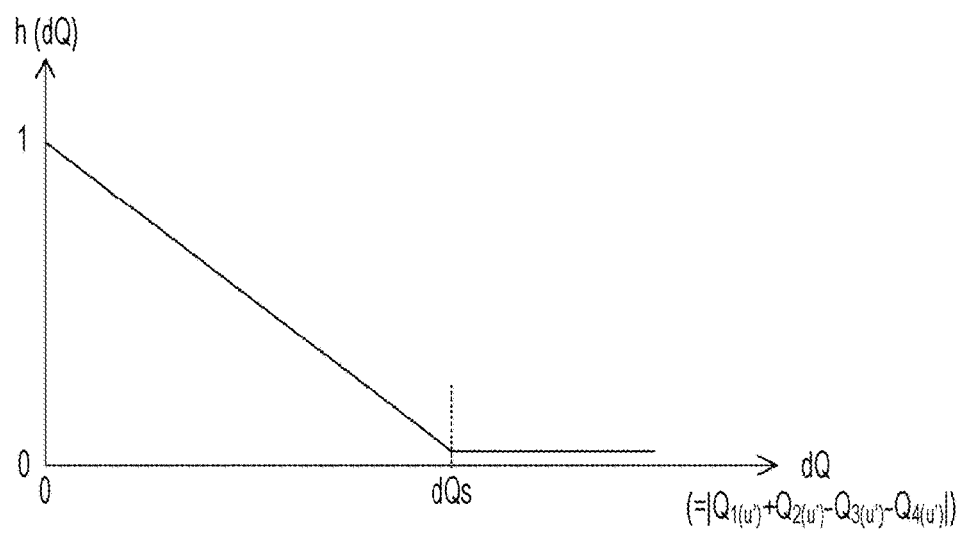
FIG. 16 is a graph of an exemplary function h( ) according to the third embodiment of the present technology.

FIG. 16 is a graph of an exemplary function h( ) according to the third embodiment of the present technology. The abscissa in FIG. 16 indicates an absolute difference value dQ between the sum of the charge signals Q1 and Q2 and the sum of the charge signals Q3 and Q4, and the ordinate indicates a value of the function h( ) for each absolute difference value.

Here, the absolute difference value dQ is "zero" under an ideal condition in which no noise is caused. Therefore, it is considered that the larger the absolute difference value dQ is, the lower the reliability of the charge signals $Q1_{(u')}$ to $Q4_{(u')}$ is. Therefore, the function (h) returns a coefficient of "one" when the absolute difference value dQ is "zero" and returns a smaller coefficient as the difference absolute value is larger. The use of the weighting coefficient in the filter enables to reduce a contribution ratio of the charge signal with low reliability.

Figure 17:
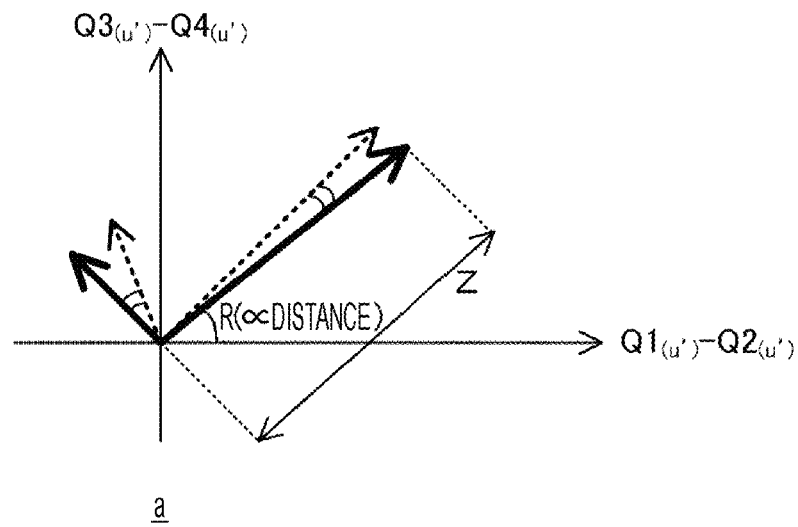
FIG. 17 is diagram of examples of a length Z on a phase plane and a function m( ) according to the third embodiment of the present technology.
Figure 17:
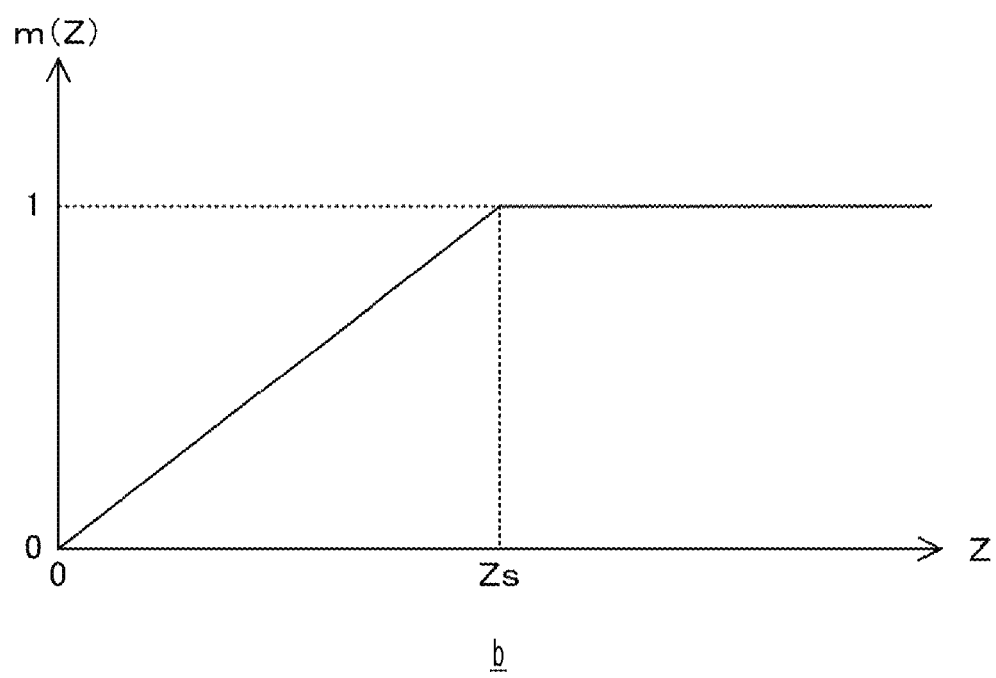

FIG. 17 is diagram of examples of a length Z on a phase plane and a function m( ) according to the third embodiment of the present technology. In a of FIG. 17, a topological space is illustrated. The vertical axis in a of FIG. 17 indicates a difference between the charge signals $Q3_{(u')}$ and $Q4_{(u')}$, and the horizontal axis indicates a difference between the charge signals $Q1_{(u')}$ and $Q2_{(u')}$. In the topological space, a solid arrow expresses a vector indicating a direction from the origin to a point corresponding to the measured charge signal. An angle R formed by the vector and the horizontal axis indicates a phase difference between irradiation light and reflected light. Furthermore, a dotted arrow indicates a vector corresponding to a true phase difference. An angle formed by the solid arrow and the dotted arrow indicates an error from the true value. As illustrated in a of FIG. 17, the shorter the length Z of the solid arrow is, the larger the error tends to be. The length Z is expressed, for example, by the following formula.

$$Z = \{(Q1_{(u')} - Q2_{(u')})^2 + (Q3_{(u')} - Q4_{(u')})^2\}^{1/2}$$

In b of FIG. 17, an exemplary function m( ) is illustrated. In b of FIG. 17, the horizontal axis indicates the length Z, and the vertical axis indicates a value of the function m( ) corresponding to the length Z. As described above, as the length Z gets shorter, the error is increased, and the reliability is lowered. Therefore, the function ( ) returns a larger weight coefficient as the length Z is larger. The use of the weighting coefficient in the filter enables to reduce a contribution ratio of the charge signal with low reliability.

Figure 18:
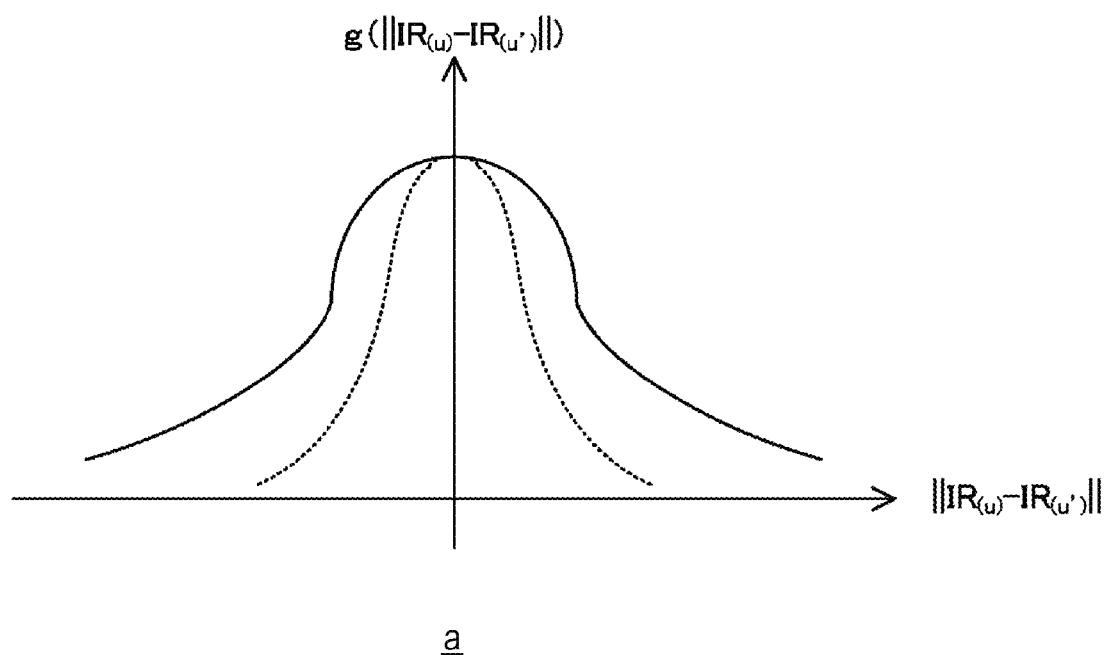
FIG. 18 is a diagram of exemplary functions g( ) and $W_{u,u'}$ according to the third embodiment of the present technology.
Figure 18:
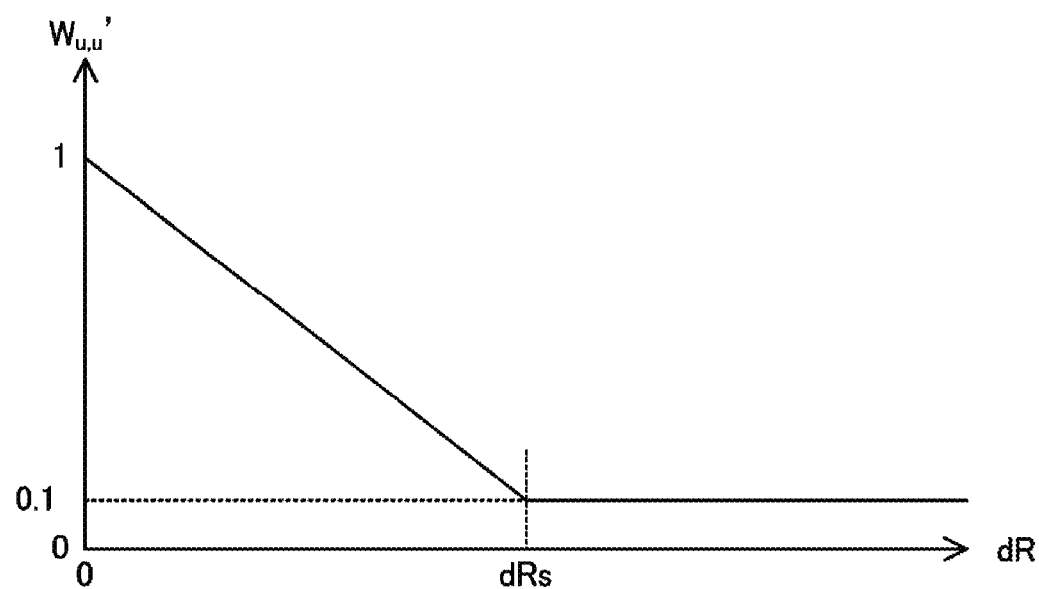

FIG. 18 is a diagram of exemplary functions g( ) and $W_{u,u'}$ according to the third embodiment of the present technology. In a of FIG. 18, an exemplary function g( ) indicated by Expression 14 is illustrated. In a of FIG. 18, the horizontal axis indicates an absolute difference value between a luminance $IR_{(u)}$ and a luminance $IR_{(u')}$, and the vertical axis indicates the value of the function g( ). Furthermore, a solid curved line indicates a trajectory of the function g( ) when $W_{u,u'}$ is other than "one", and a dotted curved line indicates a trajectory of the function g( ) when $W_{u,u'}$ is "one", that is, a general Gaussian function. As illustrated in a of FIG. 18, the function $W_{u,u'}$ can change the variance of the function g( ).

In b of FIG. 18, an exemplary function $W_{u,u'}$ is illustrated. In a of FIG. 18, the horizontal axis indicates the phase difference dR, and the vertical axis indicates the value of the function $W_{u,u'}$ for each phase difference dR. Since the distance (depth) and the phase R are in a proportional relationship, it can be considered that the smaller the phase difference dR between the phase corresponding to the coordinate u from which the noise has been removed and the phase corresponding to the coordinate u' before noise is removed is, the more reliable the data is. Therefore, the function $W_{u,u'}$ returns a coefficient of "one" when the phase difference dR is "zero" and returns a smaller coefficient as the phase difference dR becomes larger. By applying the coefficient to the function g( ), it is possible to increase the variance of the function g( ) and reduce the contribution ratio of data with low reliability.

Figure 19:
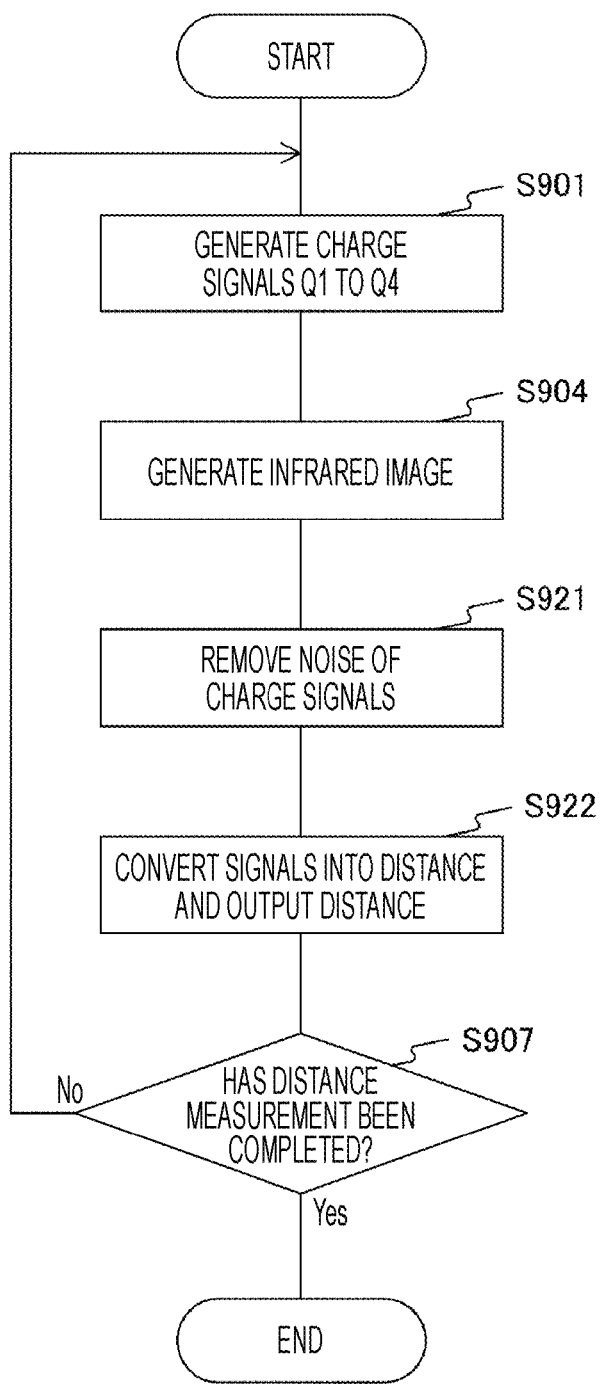
FIG. 19 is a flowchart of an exemplary operation of a distance measuring module according to the third embodiment of the present technology.

FIG. 19 is a flowchart of an exemplary operation of the distance measuring module 100 according to the third embodiment of the present technology. The distance measuring module 100 generates charge signals Q1 to Q4 for each pixel (step S901) and generates the infrared image data (step S904). Then, the distance measuring module 100 inputs the infrared image data and the charge signals Q1 to Q4 to the cross-bilateral filter and removes the noises of the charge signals (step S921). The distance measuring module converts the charge signals $Q1_{nr}$ to $Q4_{nr}$ from which the noises have been removed into the distance D and outputs the distance D (step S922). After step S922, the distance measuring module 100 executes step S907 and the subsequent steps.

In this way, according to the third embodiment of the present technology, the distance measuring module 100 removes the noises of the charge signals by the cross-bilateral filter. Therefore, a depth map with high image quality can be generated from the charge signals from which the noises have been removed.

4. Fourth Embodiment

In the third embodiment described above, the distance measuring module 100 has removed the noises of the charge signals by the cross-bilateral filter. However, it is also possible to remove the noise of the depth map instead of the charge signals. A distance measuring module 100 according to a fourth embodiment is different from that in the third embodiment in that noise of the depth map is removed by the cross-bilateral filter.

Figure 20:
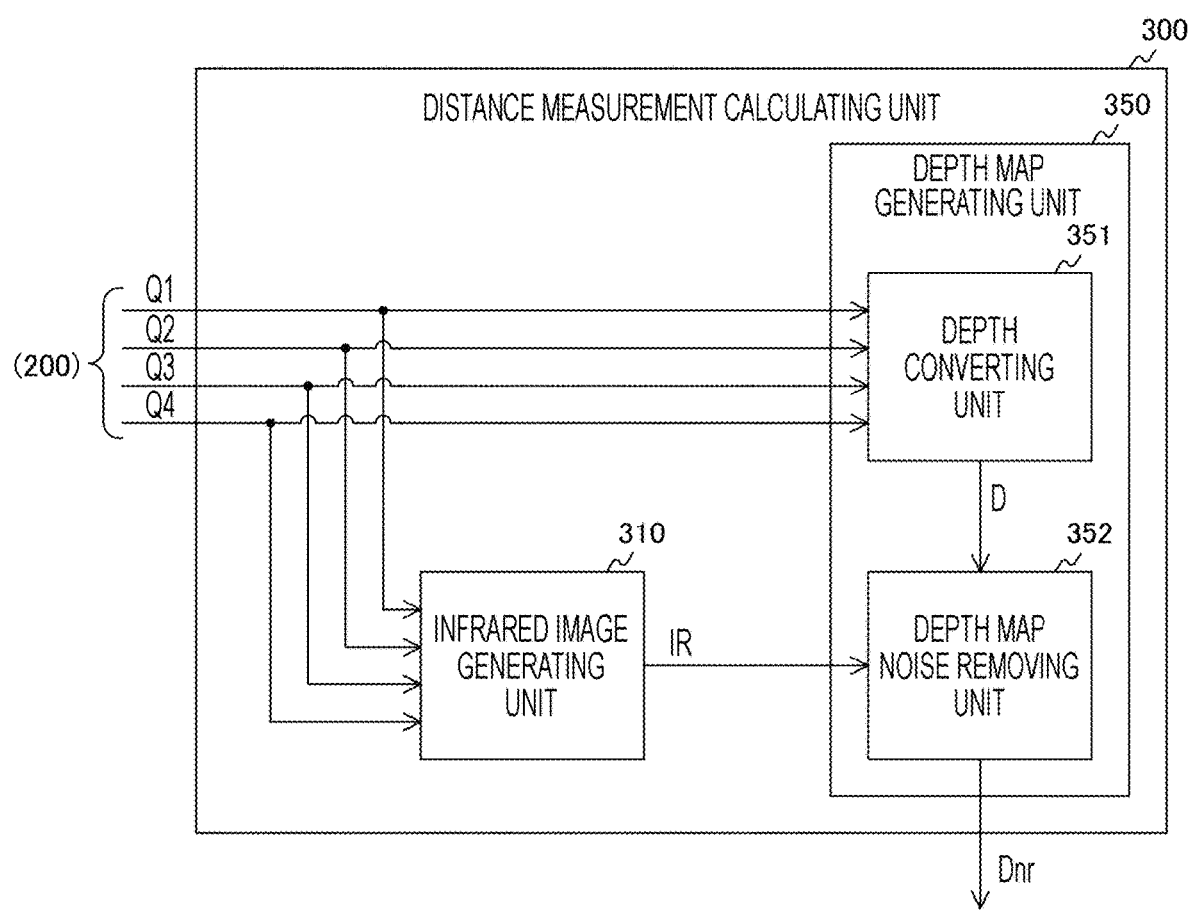
FIG. 20 is a block diagram of an exemplary configuration of a distance measurement calculating unit according to a fourth embodiment of the present technology.

FIG. 20 is a block diagram of an exemplary configuration of a distance measurement calculating unit 300 according to the fourth embodiment of the present technology. The distance measurement calculating unit 300 according to the fourth embodiment is different from that in the third embodiment in that a depth map generating unit 350 is included instead of the depth map generating unit 340.

The depth map generating unit 350 includes a depth converting unit 351 and a depth map noise removing unit 352. The configuration of the depth converting unit 351 is similar to that of the depth converting unit 342 according to the third embodiment.

The depth map noise removing unit 352 inputs a depth map and infrared image data to the cross-bilateral filter to remove the noise of the depth map. The depth map noise removing unit 352 outputs the depth map to the outside. In the depth map to be output, information of a distance $D_{nr}$ (depth) from which the noise has been removed is arranged. The distance $D_{nr}$ is calculated by the cross-bilateral filter indicated by the following formula.

[Formula 22]

$$D_{nr(u)} = \frac{1}{k''_{(u)}} \sum_{u' \in \Omega_u} \{D_{(u')} \times f(\|u - u'\|) \times g(\|IR_{(u)} - IR_{(u')}\|)\} \quad \text{Expression 22}$$

[Formula 23]

$$k''_{(u)} \equiv \sum_{u' \in \Omega_u} \{f(\|u - u'\|) \times g(\|IR_{(u)} - IR_{(u')}\|)\} \quad \text{Expression 23}$$

As described above, in the third embodiment, the noises of the charge signals have been removed by the cross-bilateral filter. Whereas, in the fourth embodiment, the noise of the depth map is removed by the cross-bilateral filter.

Figure 21:
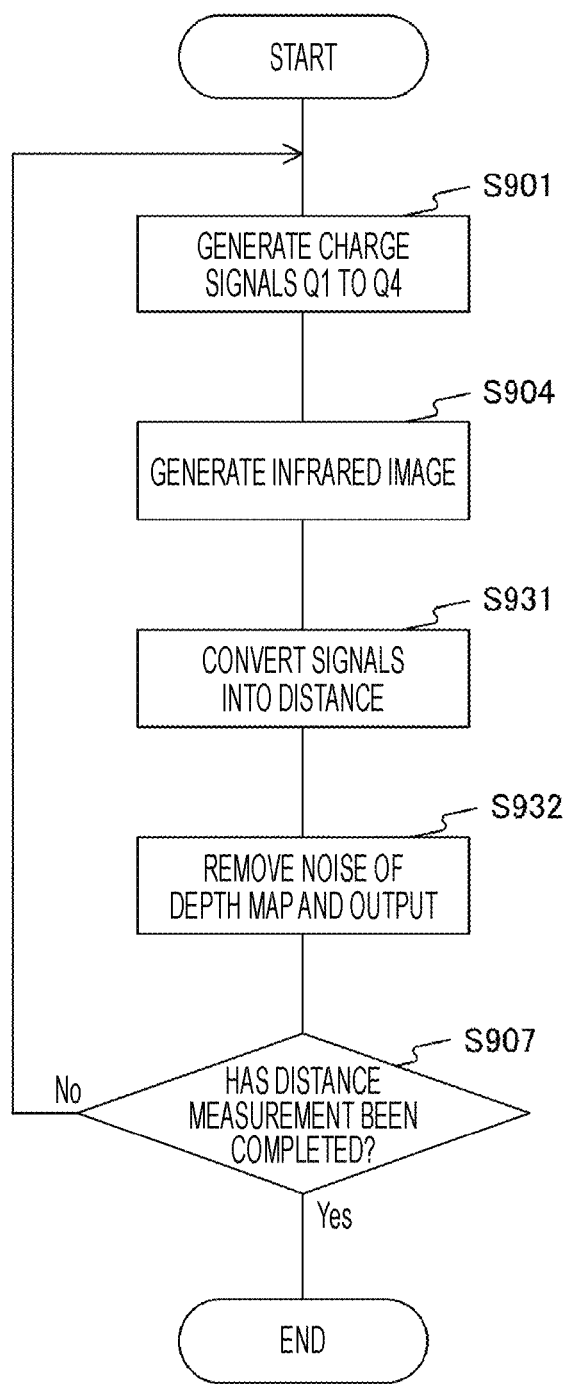
FIG. 21 is a flowchart of an exemplary operation of a distance measuring module according to the fourth embodiment of the present technology.

FIG. 21 is a flowchart of an exemplary operation of the distance measuring module 100 according to the fourth embodiment of the present technology. The distance measuring module 100 generates charge signals Q1 to Q4 for each pixel (step S901) and generates the infrared image data (step S904). Then, the distance measuring module 100 converts the charge signals Q1 to Q4 into the distance D (step S931). The distance measuring module 100 inputs the depth map and the infrared image data to the cross-bilateral filter, removes the noise of the depth map, and outputs the depth map (step S932). After step S932, the distance measuring module 100 executes step S907 and the subsequent steps.

In this way, according to the fourth embodiment of the present technology, since the noise of the depth map is removed by the cross-bilateral filter, the image quality of the depth map can be improved.

<Application to Mobile Body>

The technology according to the present disclosure (present technology) can be applied to various products. For example, the technology according to the present disclosure is realized as an apparatus to be mounted on any type of mobile body such as a car, an electric vehicle, a hybrid electric vehicle, a motorcycle, a bicycle, a personal mobility, an airplane, a drone, a ship, and a robot.

Figure 22:
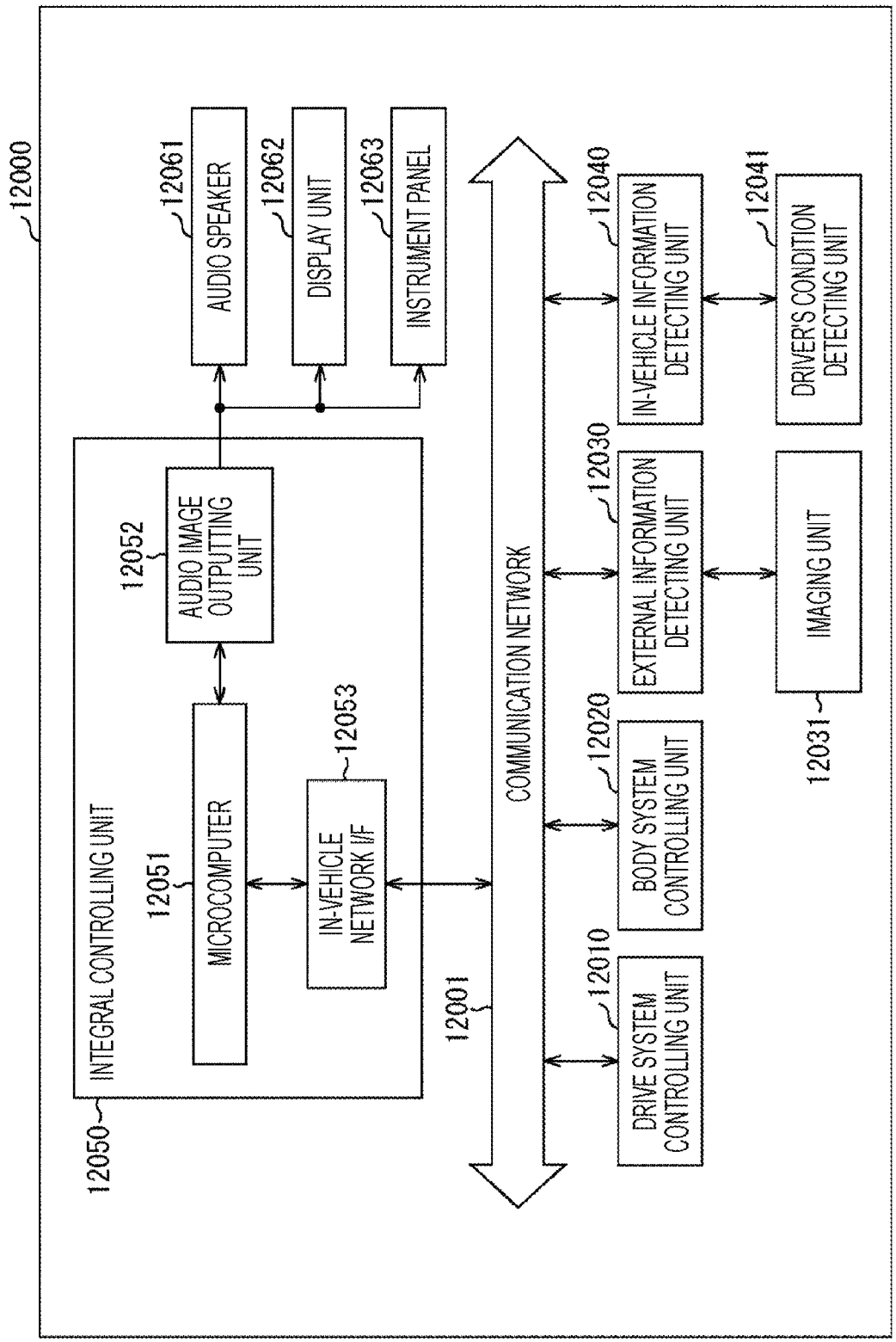
FIG. 22 is a block diagram of an exemplary schematic configuration of a vehicle control system.

FIG. 22 is a block diagram of an exemplary schematic configuration of a vehicle control system which is an example of a mobile body control system to which the technology according to the present disclosure can be applied.

A vehicle control system 12000 includes a plurality of electronic control units connected via a communication network 12001. In the example illustrated in FIG. 22, the vehicle control system 12000 includes a drive system controlling unit 12010, a body system controlling unit 12020, an external information detecting unit 12030, an in-vehicle information detecting unit 12040, and an integral controlling unit 12050. Furthermore, as a functional configuration of the integral controlling unit 12050, a microcomputer 12051, an audio image outputting unit 12052, and an in-vehicle network interface (I/F) 12053 are illustrated.

The drive system controlling unit 12010 controls an operation of a device relating to a driving system of the vehicle in accordance with various programs. For example, the drive system controlling unit 12010 functions as a control device of a device such as a driving force generating device to generate a driving force of the vehicle such as an internal combustion engine or a driving motor, a driving force transmitting mechanism to transmit the driving force to wheels, a steering mechanism which adjusts a steering angle of the vehicle, and a braking device which generates a braking force of the vehicle.

The body system controlling unit 12020 controls operations of various devices attached to the vehicle body in accordance with various programs. For example, the body system controlling unit 12020 functions as a control device of a keyless entry system, a smart key system, a power window device, or various lamps such as a head lamp, a back lamp, a brake lamp, a direction indicator, or a fog lamp. In this case, a radio wave transmitted from a portable machine for substituting a key or signals of various switches may be input to the body system controlling unit 12020. The body system controlling unit 12020 receives the input of the radio wave or the signal and controls a door locking device of the vehicle, the power window device, the lamp, and the like.

The external information detecting unit 12030 detects external information of the vehicle including the vehicle control system 12000. For example, the external information detecting unit 12030 is connected to an imaging unit 12031. The external information detecting unit 12030 makes the imaging unit 12031 image an image outside the vehicle and receives the imaged image. The external information detecting unit 12030 may perform processing of detecting an object such as a human, a car, an obstacle, a sign, or letters on the road or distance detection processing on the basis of the received image.

The imaging unit 12031 is an optical sensor which receives light and outputs an electric signal according to an amount of received light. The imaging unit 12031 can output the electric signal as an image or output the electric signal as information for distance measurement. Furthermore, the light received by the imaging unit 12031 may be visible light or invisible light such as infrared light.

The in-vehicle information detecting unit 12040 detects in-vehicle information. The in-vehicle information detecting unit 12040 is connected to, for example, a driver's condition detecting unit 12041 for detecting a condition of a driver. The driver's condition detecting unit 12041 includes, for example, a camera which images the driver. On the basis of the detected information input by the driver's condition detecting unit 12041, the in-vehicle information detecting unit 12040 may calculate a fatigue degree or a concentration degree of the driver and may determine whether the driver falls asleep.

For example, the microcomputer 12051 can calculate a control target value of the driving force generating device, the steering mechanism, or the braking device on the basis of information inside and outside the vehicle obtained by the external information detecting unit 12030 or the in-vehicle information detecting unit 12040 and can output a control instruction to the drive system controlling unit 12010. For example, the microcomputer 12051 can perform cooperative control to realize a function of an Advanced Driver Assistance System (ADAS) including collision avoidance or impact relaxation of the vehicle, a following travel based on a distance between vehicles, a vehicle speed maintaining travel, a vehicle collision warning, or a lane deviation warning of the vehicle.

In addition, the microcomputer 12051 controls the driving force generating device, the steering mechanism, the braking device, or the like on the basis of the information on the surroundings of the vehicle obtained by the external information detecting unit 12030 or the in-vehicle information detecting unit 12040 so as to perform cooperative control for automatic drive in which the vehicle autonomously travels without depending on an operation by the driver and the like.

In addition, the microcomputer 12051 can output a control instruction to the body system controlling unit 12020 on the basis of the information of the outside of the vehicle obtained by the external information detecting unit 12030. For example, the microcomputer 12051 controls the headlamps according to a position of a preceding vehicle or an oncoming vehicle detected by the external information detecting unit 12030 so as to perform cooperative control to prevent a glare such as switching a high beam to a low beam.

The audio image outputting unit 12052 transmits an output signal which is at least one of a voice or an image to an output device which can visually or auditorily notify information of the occupant of the vehicle or the outside the vehicle. In the example in FIG. 22, an audio speaker 12061, a display unit 12062, and an instrument panel 12063 are exemplified as the output device. The display unit 12062 may include, for example, at least one of an on-board display and a head-up display.

Figure 23:
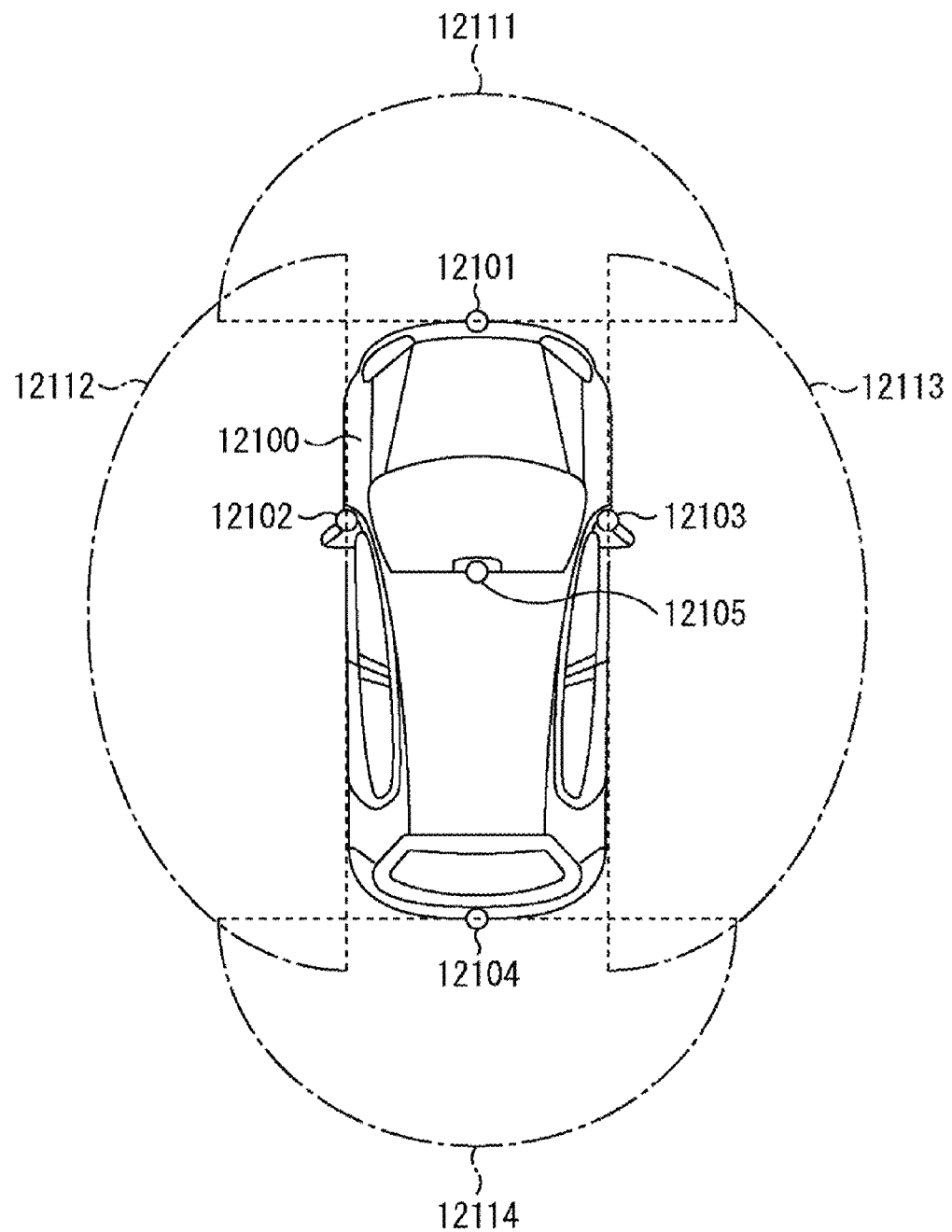
FIG. 23 is an explanatory diagram of exemplary installation positions of imaging units.

FIG. 23 is an explanatory diagram of an exemplary installation position of the imaging unit 12031.

In FIG. 23, the imaging unit 12031 includes imaging units 12101, 12102, 12103, 12104, and 12105.

Each of the imaging units 12101, 12102, 12103, 12104, and 12105 is provided in one of, for example, a front nose, a side mirror, a rear bumper, a back door, and an upper side of a windshield in a vehicle interior of a vehicle 12100. The imaging unit 12101 provided in the front nose and the imaging unit 12105 provided on the upper side of the windshield in the vehicle interior mainly obtain images in front side of the vehicle 12100. The imaging units 12102 and 12103 provided in the side mirrors mainly obtain images on the sides of the vehicle 12100. The imaging unit 12104 provided in the rear bumper or the back door mainly obtains an image on the back side of the vehicle 12100. The imaging unit 12105 provided on the upper side of the windshield in the vehicle interior is mainly used to detect a preceding vehicle, a pedestrian, an obstacle, a traffic light, a traffic sign, a traffic lane, or the like.

It should be noted that, in FIG. 23, exemplary imaging ranges of the imaging units 12101 to 12104 are illustrated. An imaging range 12111 indicates an imaging range of the imaging unit 12101 provided in the front nose, and imaging ranges 12112 and 12113 respectively indicate imaging ranges of the imaging units 12102 and 12103 provided in the side mirrors. An imaging range 12114 indicates an imaging range of the imaging unit 12104 provided in the rear bumper or the back door. For example, image data imaged by the imaging units 12101 to 12104 is superposed so that a bird's-eye image of the vehicle 12100 viewed from above can be obtained.

At least one of the imaging units 12101 to 12104 may have a function of obtaining distance information. For example, at least one of the imaging units 12101 to 12104 may be a stereo camera including a plurality of imaging elements or may be an imaging element having pixels to detect a phase difference.

For example, by obtaining a distance to solid objects in the respective imaging ranges 12111 to 12114 and a temporal change of the distance (relative speed to vehicle 12100) on the basis of the distance information obtained from the imaging units 12101 to 12104, the microcomputer 12051 can extract a solid object which is positioned on a traveling route of the vehicle 12100 and positioned closest to the vehicle 12100 and travels at a predetermined speed (for example, equal to or more than 0 km/h) in a direction substantially the same as the direction in which the vehicle 12100 travels, as a preceding vehicle. In addition, the microcomputer 12051 can set a distance between the vehicles which should be previously secured in front of the preceding vehicle and perform automatic brake control (including following travel stop control), automatic acceleration control (including following travel start control), and the like. In this way, the cooperative control can be performed for automatic drive and the like in which the vehicle autonomously travels without depending on the operation by the driver.

For example, on the basis of the distance information obtained from the imaging units 12101 to 12104, the microcomputer 12051 can classify solid object data regarding the solid object into a two-wheeled vehicle, a regular vehicle, a large vehicle, a pedestrian, a utility pole, and other solid object and extract the data so as to use the extracted data to automatically avoid an obstacle. For example, the microcomputer 12051 identifies an obstacle around the vehicle 12100 into an obstacle which can be visually recognized by the driver of the vehicle 12100 and an obstacle which is hard to be visually recognized by the driver. Then, the microcomputer 12051 determines a collision risk indicating a danger of risk of the collision with each obstacle. When the collision risk is equal to or higher than a predetermined value and the vehicle may collide the obstacle, the microcomputer 12051 can assist driving to avoid collision by outputting a warning to the driver via the audio speaker 12061 and the display unit 12062 or by forcing deceleration or steering to avoid the obstacle via the drive system controlling unit 12010.

At least one of the imaging units 12101 to 12104 may be an infrared camera for detecting infrared light. For example, the microcomputer 12051 can recognize a pedestrian by determining whether the pedestrian exists in the imaged images of the imaging units 12101 to 12104. The recognition of the pedestrian is performed, for example, by a procedure of extracting feature points in the imaged images of the imaging units 12101 to 12104 as the infrared cameras and a procedure of performing pattern matching processing on the series of feature points indicating the shape of the object to determine whether the object is a pedestrian. When the microcomputer 12051 determines that the pedestrian exists in the imaged images of the imaging units 12101 to 12104 and recognizes the pedestrian, the audio image outputting unit 12052 controls the display unit 12062 to display superimposed rectangular outlines to emphasize the recognized pedestrian. Furthermore, the audio image outputting unit 12052 may control the display unit 12062 to display an icon and the like indicating the pedestrian at a desired position.

An example of the vehicle control system to which the technology according to the present disclosure can be applied has been described above. The technology according to the present disclosure can be applied to the imaging unit 123031 in the above configuration. Specifically, the distance measuring module 100 in FIG. 1 can be applied to the imaging unit 123031 in FIG. 22. By applying the technology according to the present disclosure to the imaging unit 123031, the depth map with high image quality can be obtained. Therefore, it is possible to accurately control the vehicle by using the depth map.

Note that the embodiments indicate examples for embodying the present technology, and matters in the embodiments and invention specifying matters in claims have correspondence relations. Similarly, the invention specifying matters in claims and the matters in the embodiments of the present technology denoted by the same names have correspondence relations. However, the present technology is not limited to the embodiments, and can be embodied by applying various modifications to the embodiments without departing from the scope of the present technology.

Furthermore, the processing procedures described in the above embodiments may be understood as a method having the series of procedures, a program for causing a computer to execute the series of procedures, or a recording medium for storing the program. As the recording medium, for example, a compact disc (CD), a mini disc (MD), a digital versatile disc (DVD), a memory card, a Blu-ray (registered trademark) disc, or the like can be used.

Note that the effects described herein are only exemplary and not limited to these. In addition, there may be an additional effect.

Note that, the present technology can have the following configuration.

(1) A distance measuring device including:
  a pixel array unit including a plurality of pixels which receives predetermined intermittent light and is arranged in a two-dimensional lattice pattern;
  a continuous light image data generating unit configured to generate continuous light image data in which a plurality of pieces of pixel data indicating a luminance of predetermined continuous light is arranged in a two-dimensional lattice pattern on the basis of received light data of each of the plurality of pixels; and
  a depth map generating unit configured to generate a depth map in which distance information corresponding to each of the plurality of pixels is arranged from the received light data and the continuous light image data.

(2) The distance measuring device according to (1), in which
  each piece of the received light data includes a plurality of charge signals, and
  the continuous light image data generating unit generates the continuous light image data by integrating the plurality of charge signals for each of the plurality of pixels.

(3) The distance measuring device according to (1), in which
  the depth map generating unit obtains a charge signal when a predetermined function, to which the plurality of charge signals and the continuous light image data have been input, is minimized to generate the depth map from the charge signals.

(4) The distance measuring device according to (1), in which
  the depth map generating unit generates the depth map by using a predetermined filter.

(5) The distance measuring device according to (4), in which
  the pixel array unit is divided into a plurality of pixel blocks, and
  the depth map generating unit includes:
  a low resolution charge signal generating unit which generates a plurality of charge signals for each of the plurality of pixel blocks by pixel addition to the received light data as low resolution charge signals;
  a low resolution continuous light image data generating unit which integrates the low resolution charge signal for each of the plurality of pixel blocks and outputs low resolution continuous light image data in which data according to the integrated value is arranged;
  a low resolution depth map generating unit which generates data in which distance information corresponding to each of the plurality of pixel blocks is arranged as a low resolution depth map on the basis of the low resolution charge signal; and
  a high resolution depth map generating unit which inputs the continuous light image data, the low resolution continuous light image data, and the low resolution depth map to the predetermined filter to generate the depth map.

(6) The distance measuring device according to (4), in which
  the pixel array unit is divided into a plurality of pixel blocks, and
  the depth map generating unit includes:
  a low resolution charge signal generating unit which generates a plurality of charge signals for each of the plurality of pixel blocks by pixel addition to the received light data as low resolution charge signals;
  a low resolution continuous light image data generating unit which integrates the low resolution charge signal for each of the plurality of pixel blocks and outputs low resolution continuous light image data in which data according to the integrated value is arranged;
  a high resolution charge signal generating unit which inputs the continuous light image data, the low resolution continuous light image data, and the low resolution charge signals to the predetermined filter to generate a new charge signal for each of the plurality of pixels as a high resolution charge signal; and
  a depth converting unit which converts the high resolution charge signal into the distance information.

(7) The distance measuring device according to (4), in which
  the depth map generating unit includes:
  a depth converting unit which converts the plurality of charge signals into the distance information; and
  a depth map noise removing unit which inputs the distance information and the continuous light image data to the predetermined filter to remove a noise of the distance information.

(8) The distance measuring device according to (4), in which
  the depth map generating unit includes:
  a charge signal noise removing unit which inputs the continuous light image data and the plurality of charge signals to the predetermined filter to remove a noise of the plurality of charge signals; and a depth converting unit which converts the plurality of charge signals from which the noise has been removed into the distance information.

(9) The distance measuring device according to (8), in which the plurality of charge signals may include a first, second, third, and fourth charge signals, and the predetermined filter is a filter in which a weighting coefficient which gets smaller as an absolute difference value between a sum of the first and the second charge signals and a sum of the third and the fourth charge signals is larger is multiplied by a predetermined Gaussian function.

(10) The distance measuring device according to (8) or (9), in which the plurality of charge signals includes a first, second, third, and fourth charge signals, and the predetermined filter is a filter in which a weighting coefficient which gets larger as a sum of a square of a difference between the first and the second charge signals and a square of a difference between the third and the fourth charge signals is larger is multiplied by a predetermined Gaussian function.

(11) The distance measuring device according to any one of (8) to (10), in which the predetermined filter includes a Gaussian function in which a coefficient which gets larger as a difference between a phase of the intermittent light before a noise is removed and a phase of the intermittent light from which the noise has been removed is smaller is multiplied by a term of a standard deviation.

(12) The distance measuring device according to (1), in which the pixel array unit receives the predetermined intermittent light in a predetermined period and receives the predetermined continuous light in a continuous light receiving period which is different from the predetermined period, and the continuous light image data generating unit generates the continuous light image data from the received light data in the continuous light receiving period.

(13) A method of controlling a distance measuring device, the method including:

a continuous light image data generating procedure of generating continuous light image data in which a plurality of pieces of pixel data indicating a received light amount of predetermined continuous light is arranged in a two-dimensional lattice pattern on the basis of received light data of each of a plurality of pixels in a pixel array unit in which the plurality of pixels for receiving predetermined intermittent light is arranged in a two-dimensional lattice pattern; and a depth map generating procedure of generating a depth map in which distance information corresponding to each of the plurality of pixels is arranged from the received light data and the continuous light image data.

REFERENCE SIGNS LIST

100 Distance measuring module
110 Light emitting unit
120 Light emission controlling unit
200 ToF sensor
210 Row scanning circuit
220 Pixel array unit
230 Pixel
231 Light receiving element
232 Transfer switch
233, 234 Charge accumulating unit
235, 236 Selection switch
240 Timing controlling unit
250 AD converting unit
260 Column scanning circuit
270 Signal processing unit
300 Distance measurement calculating unit
310, 311 Infrared image generating unit
315 Switch
316 Switching controlling unit
320, 330, 340, 350 Depth map generating unit
321, 331 Low resolution charge signal generating unit
322 Low resolution depth map generating unit
323, 332 Low resolution infrared image generating unit
324 High resolution depth map generating unit
333 High resolution charge signal generating unit
334, 342, 351 Depth converting unit
341 Charge signal noise removing unit
352 Depth map noise removing unit
12031 Imaging unit

The invention claimed is:

1. A distance measuring device comprising:

a pixel array unit including a plurality of pixels which receives predetermined intermittent light and is arranged in a two-dimensional lattice pattern, wherein the pixel array unit is divided into a plurality of pixel blocks;

a continuous light image data generating unit configured to generate continuous light image data in which a plurality of pieces of pixel data indicating a luminance of predetermined continuous light is arranged in a two-dimensional lattice pattern on the basis of received light data of each of the plurality of pixels; and a depth map generating unit configured to generate a depth map in which distance information corresponding to each of the plurality of pixels is arranged on the basis of the received light data and the continuous light image data, wherein the depth map generating unit is configured to generate the depth map using a predetermined filter, and the depth map generating unit includes:

a low resolution charge signal generating unit which generates low resolution charge signals for each of the plurality of pixel blocks by pixel addition to the received light data;

a low resolution continuous light image data generating unit which integrates the low resolution charge signal for each of the plurality of pixel blocks and outputs low resolution continuous light image data in which data according to an integrated value is arranged;

a low resolution depth map generating unit which generates data in which distance information corresponding to each of the plurality of pixel blocks is arranged as a low resolution depth map on the basis of the low resolution charge signal; and a high resolution depth map generating unit which inputs the continuous light image data, the low resolution continuous light image data, and the low resolution depth map to the predetermined filter to generate the depth map.

2. The distance measuring device according to claim 1, wherein
   each piece of the received light data includes a plurality of charge signals, and
   the continuous light image data generating unit generates the continuous light image data by integrating the plurality of charge signals for each of the plurality of pixels.

3. The distance measuring device according to claim 1, wherein the depth map generating unit obtains a charge signal when a predetermined function, to which a plurality of charge signals and the continuous light image data have been input, is minimized to generate the depth map from the plurality of charge signals.

4. The distance measuring device according to claim 1, wherein
   the pixel array unit receives the predetermined intermittent light in a predetermined period and receives the predetermined continuous light in a continuous light receiving period which is different from the predetermined period, and
   the continuous light image data generating unit generates the continuous light image data from the received light data in the continuous light receiving period.

5. A distance measuring device, comprising:
   a pixel array unit including a plurality of pixels which receives predetermined intermittent light and is arranged in a two-dimensional lattice pattern;
   a continuous light image data generating unit configured to generate continuous light image data in which a plurality of pieces of pixel data indicating a luminance of predetermined continuous light is arranged in a two-dimensional lattice pattern on the basis of received light data of each of the plurality of pixels; and
   a depth map generating unit configured to generate a depth map in which distance information corresponding to each of the plurality of pixels is arranged on the basis of the received light data and the continuous light image data, wherein the depth map generating unit is configured to generate the depth map using a predetermined filter,
   wherein the depth map generating unit includes:
      a charge signal noise removing unit which inputs the continuous light image data and a plurality of charge signals to the predetermined filter to remove a noise of the plurality of charge signals; and
      a depth converting unit which converts the plurality of charge signals from which the noise has been removed into the distance information, wherein
      the plurality of charge signals include a first, second, third, and fourth charge signal, and
      the predetermined filter is a filter in which a weighting coefficient which gets smaller as an absolute difference value between a sum of the first and the second charge signals and a sum of the third and the fourth charge signals is larger is multiplied by a predetermined Gaussian function.

6. A distance measuring device comprising,
   a pixel array unit including a plurality of pixels which receives predetermined intermittent light and is arranged in a two-dimensional lattice pattern;
   a continuous light image data generating unit configured to generate continuous light image data in which a plurality of pieces of pixel data indicating a luminance of predetermined continuous light is arranged in a two-dimensional lattice pattern on the basis of received light data of each of the plurality of pixels; and
   a depth map generating unit configured to generate a depth map in which distance information corresponding to each of the plurality of pixels is arranged on the basis of the received light data and the continuous light image data, wherein the depth map generating unit is configured to generate the depth map using a predetermined filter,
   wherein the depth map generating unit includes:
      a charge signal noise removing unit which inputs the continuous light image data and a plurality of charge signals to the predetermined filter to remove a noise of the plurality of charge signals; and
      a depth converting unit which converts the plurality of charge signals from which the noise has been removed into the distance information, wherein
      the plurality of charge signals include a first, second, third, and fourth charge signal, and
      the predetermined filter is a filter in which a weighting coefficient which gets larger as a sum of a square of a difference between the first and the second charge signals and a square of a difference between the third and the fourth charge signals is larger is multiplied by a predetermined Gaussian function.

7. A distance measuring device, comprising:
   a pixel array unit including a plurality of pixels which receives predetermined intermittent light and is arranged in a two-dimensional lattice pattern;
   a continuous light image data generating unit configured to generate continuous light image data in which a plurality of pieces of pixel data indicating a luminance of predetermined continuous light is arranged in a two-dimensional lattice pattern on the basis of received light data of each of the plurality of pixels; and
   a depth map generating unit configured to generate a depth map in which distance information corresponding to each of the plurality of pixels is arranged on the basis of the received light data and the continuous light image data, wherein the depth map generating unit is configured to generate the depth map using a predetermined filter,
   wherein the depth map generating unit includes:
      a charge signal noise removing unit which inputs the continuous light image data and a plurality of charge signals to the predetermined filter to remove a noise of the plurality of charge signals; and
      a depth converting unit which converts the plurality of charge signals from which the noise has been removed into the distance information,
   wherein the predetermined filter includes a Gaussian function in which a coefficient which gets larger as a difference between a phase of the intermittent light before a noise is removed and a phase of the intermittent light from which the noise has been removed is smaller is multiplied by a term of a standard deviation.

* * * * *